(12) United States Patent
Avetoom

(10) Patent No.: US 12,245,118 B2
(45) Date of Patent: Mar. 4, 2025

(54) SYSTEMS AND METHODS FOR IMPROVED NETWORK SERVICES MANAGEMENT

(71) Applicant: T-Mobile USA, Inc., Bellevue, WA (US)

(72) Inventor: Paul Avetoom, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 392 days.

(21) Appl. No.: 17/877,392

(22) Filed: Jul. 29, 2022

(65) Prior Publication Data
US 2024/0040353 A1    Feb. 1, 2024

(51) Int. Cl.
H04W 4/50      (2018.01)
H04M 1/72466   (2021.01)
H04W 12/06     (2021.01)

(52) U.S. Cl.
CPC ......... *H04W 4/50* (2018.02); *H04M 1/72466* (2021.01); *H04W 12/06* (2013.01)

(58) Field of Classification Search
CPC .... H04W 4/50; H04W 12/06; H04M 1/72466
USPC ........................................................ 455/433
See application file for complete search history.

(56) References Cited

U.S. PATENT DOCUMENTS

| | | |
|---|---|---|
| 6,539,082 B1 | 3/2003 | Lowe |
| 9,686,238 B1 | 6/2017 | Row, II |
| 10,348,735 B2 | 7/2019 | Anderson |
| 11,170,118 B2 | 11/2021 | Al-Shanqity |
| 2001/0028636 A1 | 10/2001 | Skog |
| 2007/0099599 A1 | 5/2007 | Smith |
| 2011/0265172 A1 | 10/2011 | Sharma |
| 2011/0319089 A1 | 12/2011 | Sharma |
| 2015/0109909 A1 | 4/2015 | Yeddala |
| 2015/0215784 A1 | 7/2015 | Gunasekara |
| 2016/0105420 A1 | 4/2016 | Engan |
| 2018/0075231 A1 | 3/2018 | Subramanian |
| 2019/0007861 A1 | 1/2019 | Huang |
| 2019/0281040 A1 | 9/2019 | Dhamankar |
| 2020/0267625 A1 | 8/2020 | Deshmukh |
| 2022/0312163 A1* | 9/2022 | Xu .......................... H04W 4/70 |

OTHER PUBLICATIONS

Office Action dated Mar. 14, 2023 for U.S. Appl. No. 17/877,420 (pp. 1-32).

* cited by examiner

*Primary Examiner* — Ted M Wang
(74) *Attorney, Agent, or Firm* — Lee & Hayes, P.C.

(57) ABSTRACT

A method for managing network services for a cellular network provider. The method includes receiving, via a GUI, a query input of an MSISDN number associated with a subscriber and querying a first external system using the MSISDN. In response to the query of the first external system, the method includes receiving a first set of subscriber information. The method includes querying a second external system using the MSISDN number to determine an IMSI number associated with the subscriber, and querying a third external system using the IMSI number. In response to the query of the third external system with the IMSI number, the method includes receiving a second set of subscriber information and populating one or more fields of the GUI with the first and second set of subscriber information.

20 Claims, 20 Drawing Sheets

Network Service Manager

1000

| User |
|---|
| User Access Level |
| Logout |

Subscriber Management ▼    User Access Management ▼    Reference Data Management ▼    System Management ▼

Subscriber Search

[MSISDN ▽] [_____]   [Query Subscriber] [Update Subscriber] [Query Billing] [View Raw Data]

---

Subscriber Identity

| First Name | [first name] | Last Name | [last name] | Username | [_____] |
|---|---|---|---|---|---|
| IMSI | [_____] | VIMSI | [_____] | Ban | [_____] |
| MSISDN | [_____] | IMEI | [_____] | Device ID | [_____] |
| ICCID | [_____] | EID | [_____] | | |
| User ID | [_____] | | | | |
| Email | email@email.com | | | | |

1038

| USD | Charging | Data | Messaging | SES | IAM | Voicemail | MS Search | AMF | SGSN | Account Information |

| Service | ESIM |

1036

[Refresh]

Service Instance Token [_____]

Timestamp [_____]   Token Expiry [_____]   Expired ✓

+ Service Name [_____]   Owner [__]   VIMSI [_____]   [Tear Down Tunnel] [Delete Service] [Delete Device]
  Device Name [_____]

+ Service Name [_____]   Owner [__]   VIMSI [_____]   [Tear Down Tunnel] [Delete Service] [Delete Device]
  Device Name [_____]

+ Service Name [_____]   Owner [__]   VIMSI [_____]   [Tear Down Tunnel] [Delete Service] [Delete Device]
  Device Name [_____]

+ Service Name [_____]   Owner [__]   VIMSI [_____]   [Tear Down Tunnel] [Delete Service] [Delete Device]
  Device Name [_____]

Emergency Address

Display Name [_____]   Address Status [_____]   Terms & Conditions [_____]
Unique Device ID [_____]

---

Conversation History

Choose Type: [NMS ▽]    Start Date: [04/13/2017 11:27]    End Date: [04/13/2017 18:27]    (Get History)

| DateTime | User | MSISDN | IMSI | IMEI | Operations | Systems | Details |
|---|---|---|---|---|---|---|---|

No items to share (Posts)

FIG. 13

Network Service Manager

Subscriber Management ▼    User Access Management ▼    Reference Data Management ▼    System Management ▼    [User] User Access Level — Logout

1000

Subscriber Search
[MSISDN ▽] [_____] [Query Subscriber] [Update Subscriber] [Query Billing] [View Raw Data]

Subscriber Identity

| | | | | |
|---|---|---|---|---|
| First Name | [first name] | Last Name | [last name] | Username |
| MSI | | VIMSI | | Ban |
| MSISDN | | IMEI | | Device ID |
| ICCID | | EID | | Device Type — 1042 |
| User ID | | | | Device Model |
| Email | email@email.com | | | Device Manufacturer |

| USD | Charging | Data | Messaging | SES | IAM | Voicemail | MS Search | AMF | SGSN | Account Information |

[Query AMF]

1040

Network

System
AMF Identity [_____]    AMF Hashname [_____]

Status
AMF ☐

Registration
5G ☐

AMF General Information

| | | |
|---|---|---|
| AMF Connection Management State | AMF Registration State | CPPS Identifier |
| MSISDN | DBS Pool Identifier | IMEI SV |
| IMSI | 5G TMSI | Radio Access Type |
| MIDI | UE NGAP Identifier | |
| Subscription Concealed Identifier | | |
| IMSI MSIN | PLMN ID | SUCI Routing Indicator |
| SUCI Protection Scheme | | |

AMF SUB SMF SEL

Data Network Information

| Default DNN Indicator | Data Network Name | DNN FPX | IWK EPS Indicator |
|---|---|---|---|
| True | Network 5g | 0 | True |
| False | ms | 7 | False |
| True | fast carrier.com | 8 | True |

Single Network Slice Selection Assistance Information
Slice/Service Type [_____]    Slice Differentiator [_____]    SdPresent ☐

AMF SXN gNB CGI
Cell Identity [_____]    Cell Identity [_____]

5g TAI
5G TAC [_____]    Cell Identity [_____]

Last known 5G CGI
Cell Identity [_____]    Cell Identity [_____]

Last known 5G TAI
TAC [_____]    Cell Identity [_____]

SYSTEMS AND METHODS FOR IMPROVED NETWORK SERVICES MANAGEMENT

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Large network providers may rely on many different systems to provide services, store information, manage accounts, manage network activities, charge customers, troubleshoot problems, etc. Some systems may be controlled or managed by different entities either internally or externally, and each may include different pieces of information regarding different subscribers or other network data. Additionally, many internal groups or internal entities (e.g., third-party vendors) may access all or a subset of these systems for varying purposes. Determining how to access a particular system to determine a particular set of information has traditionally been a difficult, inefficient, and time-consuming process.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In some embodiments, the disclosure describes a computer-implemented method for managing network services for a cellular network provider. The method may include providing a graphical user interface (GUI) including at least one search input field and a subscriber identifier selection field. The method may include receiving, via the GUI, a user selection of a mobile station integrated services digital network (MSISDN) identifier type via the subscriber identifier selection field and a query input of an MSISDN number associated with a subscriber. Based on the user selection of the MSISDN identifier type, the method may include querying a provisioning gateway (PGW) using the MSISDN number received via the GUI. In response to query the PGW using the MSISDN number, the method may include receiving, from the PGW, a first set of subscriber information associated with the subscriber. The first set of subscriber information may include an international mobile subscriber identity (IMSI) number associated with the subscriber. In response to receiving the IMSI number, the method may include querying at least one additional system using the IMSI number. In response to querying the at least one additional system using the IMSI number, the method may include receiving, from the at least one additional system, a second set of subscriber information associated with the subscriber and populating one or more fields of the GUI with the first set and second set of subscriber information.

In another embodiment, the disclosure describes a computer-implemented method for managing network services for a cellular network provider. The method may include receiving, via a graphical user interface (GUI), a query input of a mobile station integrated services digital network (MSISDN) number associated with a subscriber and querying a first external system using the MSISDN. In response to the query of the first external system, the method may include receiving a first set of subscriber information. The method may include querying a second external system using the MSISDN number to determine an international mobile subscriber identity (IMSI) number associated with the subscriber, and querying a third external system using the IMSI number. In response to the query of the third external system with the IMSI number, the method may include receiving a second set of subscriber information and populating one or more fields of the GUI with the first and second set of subscriber information.

In another embodiment, the disclosure describes a system for managing network services. The system may include at least one internal application server connected to a core network, a first external system server connected to the core network, a second external system server connected to the core network, and a network services manager server connected to the core network. The network services manager server may include one or more processors in communication with a memory containing processor-executable instructions to receive, from the at least one internal application server, a user selection of a mobile station integrated services digital network (MSISDN) identifier type via the subscriber identifier selection field and a query input of an MSISDN number associated with a subscriber. The memory may also contain instructions to, based on the user selection of the MSISDN identifier type, query the first external system server using the MSISDN number. The memory may also contain instructions to, in response to the query of the first external system using the MSISDN number, receive, from the first external system, a first set of subscriber information associated with the subscriber. The first set of subscriber information may include a second subscriber identifier associated with the subscriber having a different identifier type than the MSISDN identifier type. The memory may also contain instructions to, in response to receiving the second subscriber identifier, query the second external system using the second subscriber identifier. The memory may also contain instructions to, in response to the query of the second external system using the second subscriber identifier, receive a second set of subscriber information and to populate one or more fields of a graphical user interface (GUI) with the first and second set of subscriber information.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 13 is another screenshot of an embodiment of the GUI of FIG. 10;

FIG. 14 is another screenshot of an embodiment of the GUI of FIG. 10;

FIG. 19 is another screenshot of an embodiment of the GUI of FIG. 10.

Figure 1:
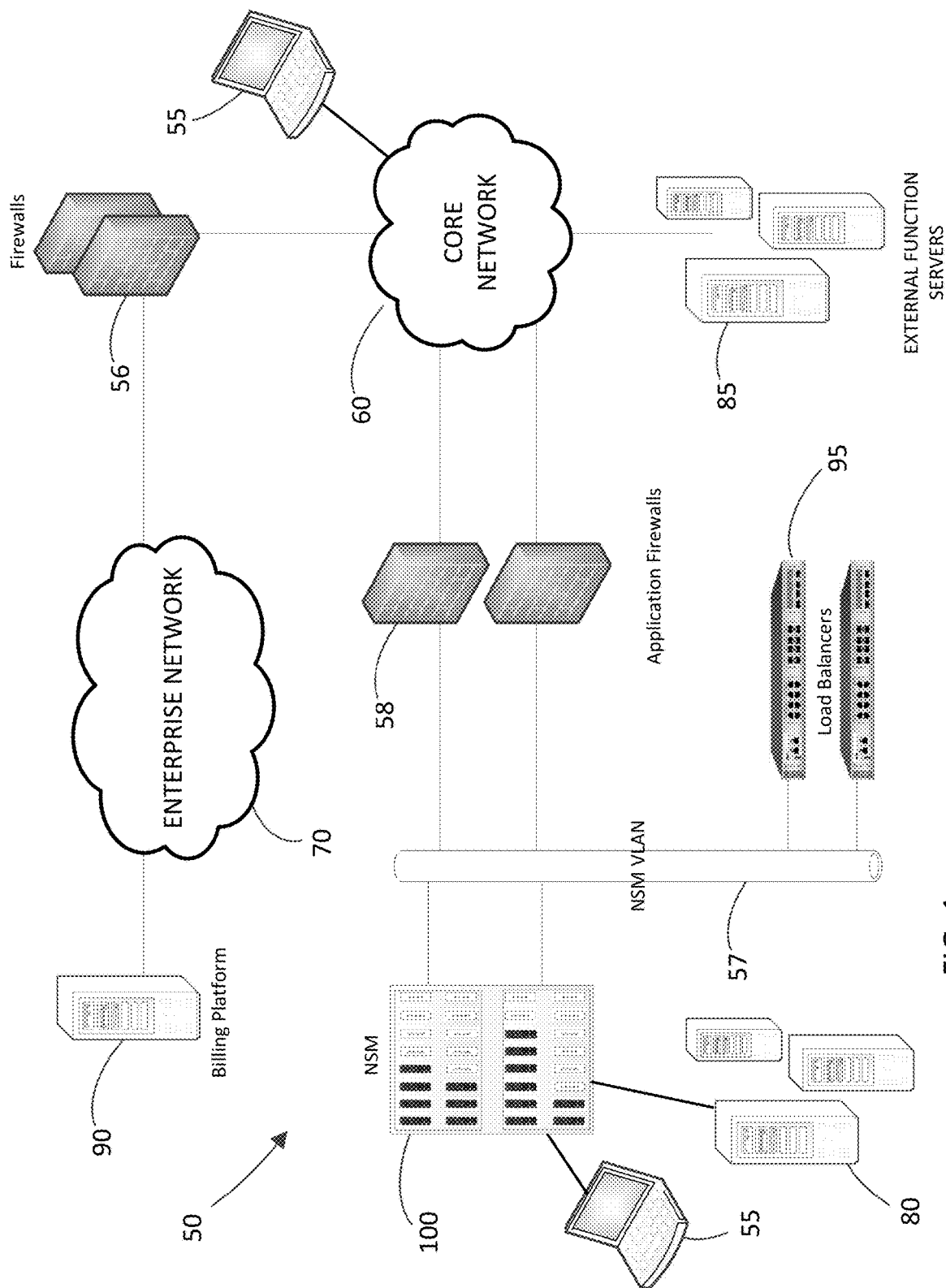
FIG. 1 is a high-level network diagram of an embodiment of a network in which a network services manager may operate in accordance with the disclosure.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Large, complex network services, such as cellular network services, may include many separate systems that each perform a particular task or set of tasks in order to provide network services. It has traditionally been difficult for entities managing these networks, such as cellular network providers, to coordinate information from each of these systems in an efficient manner. At a high level, the disclosure describes a system and methods for improved network services management that may, in some embodiments, provide central access to network systems for both internal and external users and applications. In general, the Network Services Manager (NSM) disclosed herein may provide, in some embodiments, a customer centric view of data across multiple systems.

In some embodiments, the NSM of this disclosure may provide an integrated subscriber care and management tool that may be used for internal and external access to network systems. The NSM may integrate with many or all vendors' management interfaces, may normalize access to network data, and may provide data enrichment using a configuration catalogue, among other features. In some embodiments, the NSM's integration with substantially all available network systems may enhance network data management and enable users and clients to retrieve, view, and manage customer network configuration data. In some embodiments, the NSM may provide limited access to particular users or clients based on access rights granted by configuration within the system. In some embodiments, access to the NSM may be granted through either a user interface (UI) or graphical user interface (GUI), and/or via a consolidated application programming interface (API), such as a representational state transfer (REST) API. In some embodiments, the GUI may grant access based on specific user rights and the REST API may also limit access per user that serves data to other client systems.

In some embodiments, the NSM may be used in both the operations support system (OSS) and business support system (BSS) domains. The OSS may support management functions such as network inventory, service provisioning, network configuration, fault management, etc., while the BSS may be the components that the service provider uses to run its business operations towards customers. For example, the NSM may provide customer-associated network data to entities internal to the network service provider, such as operations, customer care, legal departments, fraud monitoring and detection, law enforcement, other external entities in the business domain, etc., to perform enhanced identification and location services. In some embodiments, the NSM may provide data for various internal clients relating to customer care, operations, marketing, location enhanced identification, fault identification, engineering, business support, electronic and information technology, etc.

In some embodiments, the NSM may include a built-in user interface that may provide access to substantially all functions and features for a consolidated view of a customer's status across the core network systems with the relevant billing status and prior provisioning requests. The UI may also provide technical access to the core network and include access controls to view and modify limited functions for permissioned users. The UI may allow cross platform fault analysis and may aid in understanding the core network functions by accessing unfiltered data, and may provide fault finding and resolution functions. In some embodiments, the NSM may provide a data source to allow automated troubleshooting enrichment with customer related network data for escalated tickets. In some embodiments, the NSM may also interface with other systems to allow automatic testing of new engineering systems, and allow marketing groups to monetize network subscriber information through identify fraud management (IFM) and identity verification and fraud prevention.

The NSM disclosed herein provides a technical solution to the technical problem of accessing near constantly-changing network and subscriber data from many sources by any of a variety of entities. By providing a central hub for accessing information stored and updated related to many different systems, the NSM represents a technical improvement in computing technology by allowing client computers or servers to access information that was not previously possible or feasible. As a result of the NSM, fewer computing resources may be used to provide enhanced access to subscriber and other network information. For example, customer care representatives using the NSM may perform enhanced troubleshooting by having access to more subscriber information than would traditionally be available, which may significantly reduce resolution time of customer care issues, improving network quality and customer satisfaction. Thus, at least one practical application of the NSM is to improve network reliability, bolster customer satisfaction, and serve more customers more efficiently. The NSM described herein may also provide technical improvements to computer systems that may allow computers to perform actions not possible prior to the NSM. Specifically, a computer running the NSM may be able to access information on systems using particular inputs that would not have otherwise been accessible at all, or at least not without additional information. Thus, the capabilities of a computer running the NSM may be improved so as to provide more efficient access to more customer or subscriber data with a minimal input.

FIG. 1 is a high level network diagram 50 of an embodiment of a network environment in which the NSM 100 may operate. The NSM 100 may be hosted on one or more central servers or distributed among various locations. The NSM 100 may be built using web servers, application servers, database servers, and/or enterprise application integration (EAI) middleware. In some embodiments, high availability requirements for the NSM may be handled via commercial application servers and database servers that support the NSM. High availability implementation may be achieved using a clustered environment with a hardware-based load balancer to support application server clustering. The NSM 100 may be connected to one or more load balancers 95 via an NSM virtual local area network (VLAN) 57. In some embodiments, the load balancers 95 may be used to balance the load and perform fail-over between application servers. The NSM 100 may be connected to a core network 60 via the NSM VLAN 57 and through one or more application firewalls 58. The core network 60 may connect the NSM 100 to other components of the network 50, such as external function servers 85, user computing devices 55, and an enterprise network 70. The external function servers 85 may for be provisioning gateways (PGW), home location registers (HLR) such as GFLEX, identity access management (IAM), secure entitlement servers (SES), etc. The enterprise network 70 may be connected to the core network 60 through one or more firewalls 56, and may provide a connection to a billing platform 90, which may be hosted on one or more application servers. The NSM 100 may also be connected to one or more user computing devices 55, one or more client servers 80 (which may be internal or third-party clients), either directly or through the core network 60.

Figure 2:
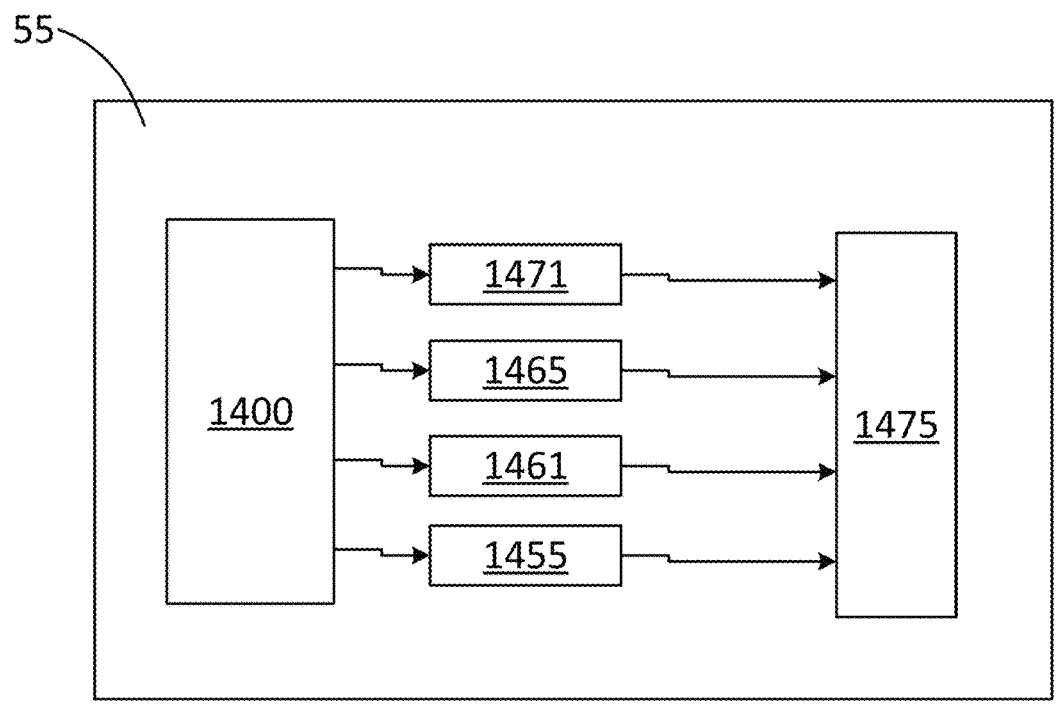
FIG. 2 is a schematic illustration of elements of an embodiment of an example computing device.
Figure 3:
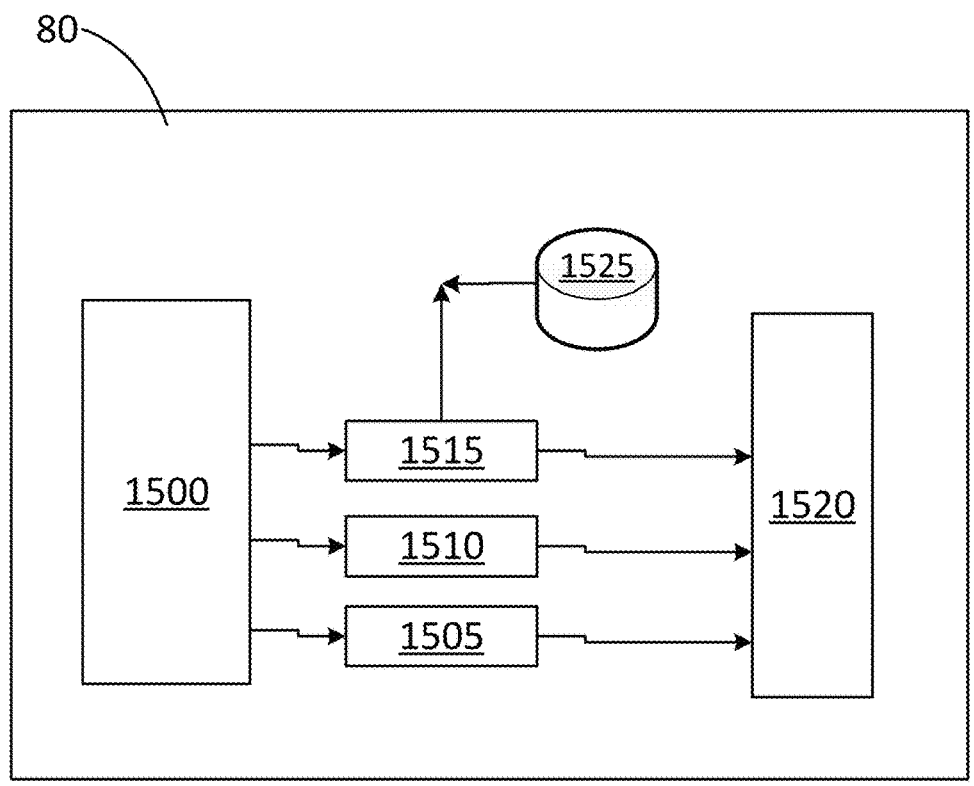
FIG. 3 is a schematic illustration of elements of an embodiment of a server-type computing device.

FIG. 2 is a simplified illustration of the physical elements that make up an embodiment of a computing device 55 and FIG. 3 is a simplified illustration of the physical elements that make up an embodiment of a server type computing device, such as the external function servers 85. Referring to FIG. 2, a sample computing device 55 is illustrated that is physically configured according to be part of the computing system 50 shown in FIG. 1. The user computing device 55 may have a processor 1451 that is physically configured according to computer executable instructions. In some embodiments, the processor can be specially designed or configured to optimize communication between application servers and the computing device 55 relating to the NSM described herein. The computing device 55 may have a portable power supply 1455 such as a battery, which may be rechargeable. It may also have a sound and video module 1461 which assists in displaying video and sound and may turn off when not in use to conserve power and battery life. The computing device 55 may also have volatile memory 1465 and non-volatile memory 1471. The computing device 55 may have GPS capabilities that may be a separate circuit or may be part of the processor 1451. There also may be an input/output bus 1475 that shuttles data to and from the various user input/output devices such as a microphone, a camera, a display, or other input/output devices. The user computing device 55 also may control communicating with the networks, such as core network 60 in FIG. 1, either through wireless or wired devices. Of course, this is just one embodiment of the user computing device 55 and the number and types of user computing devices 55 is limited only by the imagination.

The physical elements that make up an embodiment of a server, such as the external function servers 85, the client servers 80, or application servers running the NSM, are further illustrated in FIG. 3. In some embodiments, the application server may be specially configured to run the particular NSM, database, and other elements related to the NSM as described herein. At a high level, the application server may include a digital storage such as a magnetic disk, an optical disk, flash storage, non-volatile storage, etc. Structured data may be stored in the digital storage such as in a database. More specifically, the server may have a processor 1500 that is physically configured according to computer executable instructions. In some embodiments, the processor 1500 may be specially designed or configured to optimize communication between a user computing device, such as computing device 55, and the server relating to the NSM as described herein. The server may also have a sound and video module 1505 which assists in displaying video and sound and may turn off when not in use to conserve power and battery life. The server may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with the networks, such as core network 60, either through wireless or wired devices. In some embodiments, NAM controller for running the NSM through an NSM interface may be located on the user computing device 55. However, in other embodiments, the NSM controller may be located on application server, or both the computing device 55 and the server. Of course, this is just one embodiment of the application server and additional types of servers are contemplated herein.

Figure 4:
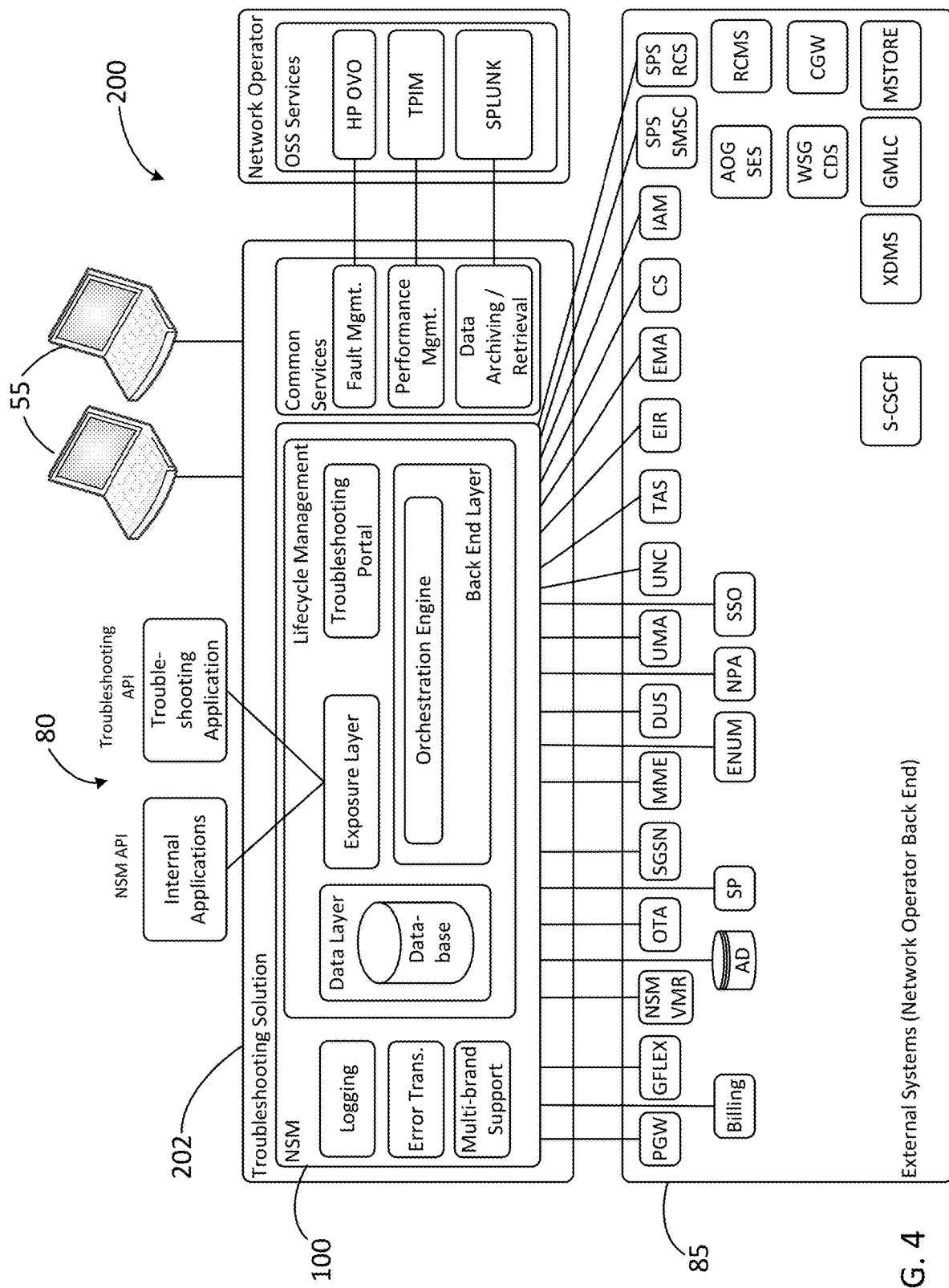
FIG. 4 is a schematic diagram of a system architecture in which the network services manager may operate in accordance with the disclosure.

FIG. 4 is a schematic diagram of an embodiment of an NSM system architecture 200 in which the NSM 100 may operate. In some embodiments, the NSM 100 may operate as part of a troubleshooting solution 202. In some embodiments, the NSM 100 may interface with southbound network systems like external function servers 85 (e.g., PGW, GFLEX, IAM, AMF, MME, etc.) and provide northbound REST interface service to extend services provided by those southbound network systems to client applications 80 or user computing devices 55. As shown in FIG. 4, the client applications 80 may include internal applications, troubleshooting applications, or third party applications that may have permission to access at least portions of the information provided by the south bound network systems. The client applications 80 and/or user computing devices 55 may interface with the NSM 100 via a REST interface using an NSM API or other suitable API, or via an NSM GUI. In some embodiments, the user computing devices 55 may access the NSM 100 via another northbound system internal application, such as a billing tool or an engineering tool. In some embodiments, the NSM 100 may interface with the various external function servers 85 in various suitable protocols, such as simple objet access protocol (SOAP), man-machine language (MML), Telnet, extensible markup language (XML), REST, structured query language (SQL), Kerberos, lightweight directory access protocol (LDAP), etc.

Figure 5:
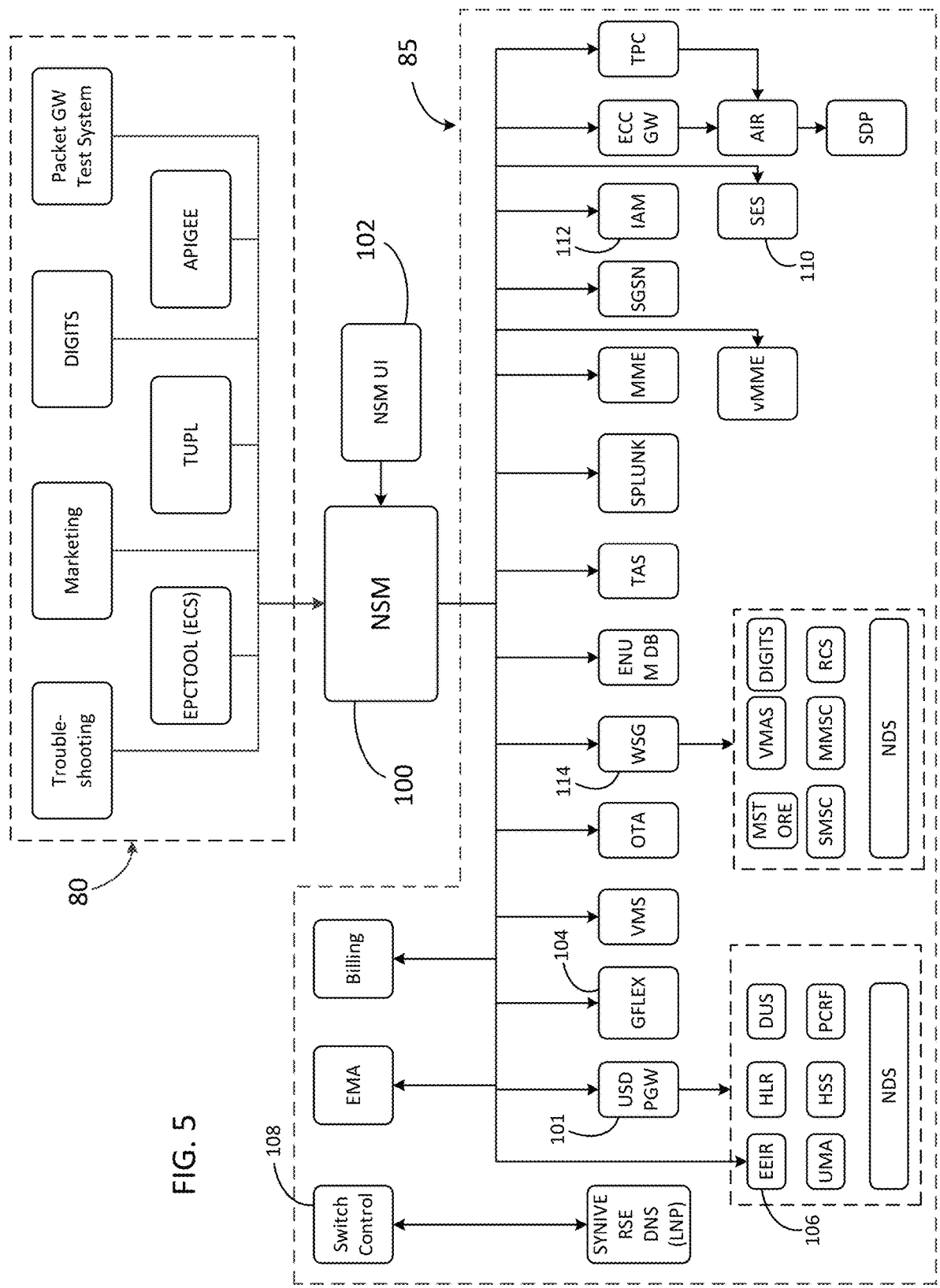
FIG. 5 is a block diagram of a network services manager integrated into an embodiment of a core network in accordance with the disclosure.

FIG. 5 shows an embodiment of the NSM 100 integrated into an embodiment of a core network, such as core network 60 in FIG. 1. The NSM 100 may provide a common conduit between internal client systems or applications 80, such as marketing, engineering, testing, troubleshooting, customer care, etc., and external function servers connected via a REST interface or other suitable user interface or protocol. The NSM 100 may also include an NSM user interface 102, which may provide access to the NSM for other applications or servers, such as partner brands, vendors, fraud detection and monitoring, engineering operations, etc. In some embodiments, the NSM 100 may interact with the external functions 85 by exposing or consuming an external service. The external service provide by the external functions may be associated with an interface of its own that may be associated with a set of external operations. Those external operations may be associated with input and output data structures through which data may be exchanged between the external functions or systems 85 and the client applications or system 80 via the NSM 100. Table 1 shows a list of external interfaces that may be supported by the NSM 100 in some embodiments, and the types of information that may be retrieved from each system:

TABLE 1

| # Scope | Objective |
| --- | --- |
| 1. Troubleshooting API | Expose NSM REST interfaces as per Troubleshooting Requirements. |
| 2. PGW | Interface with Provisioning Gateway (NSN-PGW) for subscriber data. |
| 3. GFLEX | NSM supports Tekelec G/Flex PDB Transaction Management |
| 4. SPLUNK | Data Archival: NSM will post all NSM Audit Logs to Splunk. |
| 5. FMS | Fault Management - Alarms and SNMP traps |
| 6. SNMP Alarms(ESA) | Notify external entities regarding health of the system. |
| 7. AD | Ability to support active directory (AD), user, user/groups using the LDAP protocol. |
| 8. OTA interface | OTA troubleshooting interface aids in troubleshooting subscriber accounts in regard to issues with Over-The-Air (OTA) downloads. View/Update OTI Subscriber and view SIM Profile Information. |
| 9. VMR interface: | VMR acts a provisioning proxy and routes provisioning requests/queries to the correct Voicemail platform based on the per-subscriber Voicemail configuration read from unified subscriber database (USD. The provisioning proxy is also be responsible for identifying a suitable Voicemail platform for new subscribers. NSM may send voice mail provisioning commands to the VMR. The HIA (TELNET) may be the provisioning interface |
| 10. SGSN interface | The Serving GPRS Support Node (SGSN) may be a component of the GPRS network, which handles all packet switched data within the network, e.g. the mobility management and authentication of the users. SGSN may perform similar functions as the Mobile Switching Centre (MSC) for voice traffic. |
| 11. MME interface | Mobility Management Entity (MME) is the network function of the 4G mobile core network, known as the evolved packet core (EPC). NSM may utilize the information returned from a home location register (HLR) query to identify the MME to be queried. The HLR/HSS LTE may be queried for the current MME that is assigned to a customer. |

TABLE 1-continued

| # Scope | Objective |
|---|---|
| 12. Load Balancer Status page | Load Balancer status page - may be accessed by load balancer to check applications availability. |
| 13. Switch Control | Switch Control 108 may include database interfaces for billing. |
| 14. NPA/NXX | MS SQL DB interface for getting NAP details. |
| 15. ENUM/DNS | DNS interface for getting LRN number. |
| 16. TAS | TAS provides a number of SIP (Session Initiated Protocol), Diameter interfaces with IMS (IP Multimedia Subsystem) centralized nodes as well as legacy interfaces to the circuit-switched (CS) domain. |
| 17. UNC | UMA Network controller (UNC) soap interface to get UNC parameters. |
| 18. UMA | Unlicensed Mobile Access (UMA) soap interface. Unlicensed Mobile Access (UMA), or Generic Access Network (GAN), may be an extension of GSM/GPRS mobile service that may be achieved by tunneling non-access stratum protocols between the Mobile Subscriber (MS) and the core network over a wireless IP network. |
| 19. EEIR | EEIR - Enhanced EIR may be a SOAP interface. This interface may return subscriber's device details to offer appropriate services to subscriber. |
| 20. RTR | A PGW function that may correct issues with Subscriber Registration and CSCF Address. Delete RTR and Add RTR operations |
| 21. IAM | NSM - IAM interfaces may access the information that IAM 112 controls and provide ability to update and modify Subscriber data based on a user profile |
| 22. DIGITS | NSM to support DIGITS services exposed by the WSG 114 (Web Services Gateway) |
| 23. MESSAGING | NSM may support integration with the central database (CDB) interface for messaging application and may retrieve the common subscriber profile and the associated application specific profiles. |
| 24. MS SEARCH | To query new paradigm for MSSEARCH called "queryMSSearch" |
| 25. EMA | NSM integration with EMA to query getHistory, log information. |
| 26. VMME | NSM integration with MME - cloud based and non-cloud based - may fetch the subscriber MME information from MME systems. |
| 27. ECC-GW | Subscribers may categorized, by customer type, as either Prepay, Postpay or Flexpay. Postpay/Flexpay subscriber. Supports multiple usage counters maintained in the USD for each subscriber. |
| 28. SES | NSM integration to SES (Secure Entitlement Server) provides a unified interface for the customer care end user to maintain NSDS (Non-SIM device Services) information for OEM and generic devices. |
| 29. Charging System | The Charging System (CS) Core elements include AIR (Account Information and Refill) and SDP (Service Data Point). NSM may interact with AIR via ACIP/UCIP protocol in the AIR which proxies the SDP based on the subscribers provisioned SDP location. For charging system integration, TPC may be used as interface endpoint for charging system where TPC may act as pass through for ACIP/UCIP requests. |
| 30. NAP | An adaption to NSM that may support the interface to the NAP platform to retrieve the customers NAP account, partner, SOC and femto cell profile and service levels. |
| 31. AMF | NSM may provide subscriber details and AMF host details. |

As shown in FIG. 5, the NSM 100 may provide access to many external functions or systems 85. Depending on the external function or system and the user or client application accessing the system, various operations may be performed. The functions listed below are a non-exclusive list of external functions that may interface with the NSM 100 and be accessible by north bound systems or clients. Each external function may be accessible via the NSM 100 using an API particular to that system, and/or using the NSM UI 102 or REST interface. Each external function or system 85 may store or retrieve different types of data or other information related to the subscriber that user may seek when accessing the NSM 100 through the NSM UI 102 or otherwise Home Location Register (HLR)

The NSM 100 may support queries of USDHLR subscribers using any of the two possible options (IMSI, MSISDN) and may allow the subscriber's HLR information to be updated in the provisioning gateway (PGW) 101. The NSM 100 may use the subscriber information received from the PGW 101 and display the same to the user, which may include first class (HLR, HSS, AUC, EIR, UMA and VMR) and Second objects. The NSM 100 may allow Update (provisioned and de-provision) to attributes for HLR Subscriber. These may include:

Subscriber Basic Services

Telephony, Circuit Switched Data, Fax, and Faxmail

Call Forwarding options: User and Operator Controlled

Subscriber Teleservices
Subscriber Supplementary Services
Subscriber Cancel location—All (CanLoc Function)
Subscriber APN List (GPRS): APN/QOS
Provision and De-Provisioning of SMS over GPRS
Subscriber Roaming features Home Subscriber Server (HSS)

The NSM UI 102 may support HSS Subscriber queries and results and HSS modification, depending on user access permissions. For Query and modify, the NSM 100 may interact with southbound interface PGW 101. For an HSS Subscriber query, the NSM 100 may send a subscriber query request to PGW 101, and get a response which may contain HLR, HSS, AUC, EIR information. The HSS Section in the response may be displayed in an HSS sub tab of a subscriber query result in the NSM user interface 102. For modify scenarios, the NSM 100 may send modify request to the PGW 101 and receive an updated response back. The NSM 100 may manage the reference data for the HSS in the Reference Data Management UI/HSS section of the NSM user interface 102. The Reference Data Management UI/HSS section may contain UIs for adding, removing, and updating reference data in an NSM database. The user access management section may contain the access settings (Read Only, Read Write, Hidden) for each user group of the NSM 100.

Blacklisted MSISDN

In some embodiments, the NSM 100 may support new user scenarios whereby any mobile station integrated services digital network (MSISDN) updates may be validated against a blacklist database table prior to any subsequent queries or updates. If there are matches to any of the entries in the blacklist database table, updates may be disallowed and appropriate responses returned. In some embodiments, the network operator may populate MSISDNs that may be utilized within the network as Global Titles (GTs), which, if inappropriately populated within Call Forwarding fields, may cause direct impact to the respective subscriber as well as others being served by that network entity.

GFLEX and Connection Management

GFLEX 104 may be a home location register and/or provide HLR management. The NSM 100 may hold the HLR name and associated point code in the NSM system configuration, which may be used to validate a subscriber's HSS and Non-HSS Profiles. The NSM 100 may provide for querying the GFLEX 104 using Point Code Determination, may support system generated automatic queries, and may provide for updating GFLEX subscription. The NSM 100 may provide system controlled user updates to GFLEX 104 in case of any HLR/HSS conflicts.

Enhanced Equipment Identity Register (EEIR)

The EEIR 106 may retrieve the device capabilities for a MSISDN, IMSI, or IMEI. A SOAP interface provided by EEIR 106 may support two operations: (1) Device queries based on a supplied IMEI (DeviceQuery); and (2) Device queries based on a supplied Subscription-ID of IMSI or MSISDN (SubscriberDeviceQuery). Using the IMSI or the MSISDN, the last IMEI used by the subscriber may be identified. The parameters returned may be configurable per client. Based on the needed configuration for the client, each client may be provided with a client ID to use.

UMA Network Controller (UNC)

The UNC may query PGW using MSISDN/IMSI, get VLR Address from PGW response, get UNC name against VLR Address from UNC-VLR reference Table, get UNC connection parameters from "UNC Connection Parameters" reference table, create dynamic SOAP URL using and connection parameter, set and restrict max permissible connection per IP (IP get from connection parameter), hit dynamic URL using MSISDN/IMSI, and display all response attribute on Tab name "UNC" next to "UMA" tab in NSM UI 102.

Unlicensed Mobile Access (UMA)

Also called generic access network (GAN). UMA may be an extension of GSM/GPRS mobile service that may be achieved by tunneling non-access stratum protocols between the Mobile Subscriber (MS) and the core network over a wireless IP network. UMA may complement traditional GSM/GPRS/UTRAN radio coverage that may provide the ability for a MS to connect to the core GSM network through the unlicensed bands provided by the likes of IEEE 802.11b WLAN, WiMax, etc.

Authentication Center (AUC)

The AUC may be part of the PGW and the NSM UI 102 may display AUC information. The NSM 100 may provide access level setting for all AUC attributes.

Telephony Application Server (TAS)

TAS may provide a number of SIP (Session Initiated Protocol), Diameter interfaces with IMS (IP Multimedia Subsystem) centralized nodes as well as legacy interfaces to the circuit-switched (CS) domain. The TAS may be a SIP BSC/RNC (Base Station Controller/Radio Network Controller) that provides IP-based network connectivity for SIP-enabled VoIP devices. In the IMS model, the SIP BSC/RNC may connect to any standard compliant IMS core S-CSCF as an application server. The MSC, in combination with the Mavenir SIP BSC/RNC, may act as a Telephony Application Server (TAS).

Billing

The NSM 100 may interface with billing for SIM status, SIM reuse, query by ICCID and provisioning errors, among other things.

Local Number Portability (LNP)

LNP may use ENUM interface to resolve addressing questions.

DATA Interface (ECC-GW)

The NSM 100 may provide support to query subscriber's data usage counters information from display it on NSM UI 102 under "DUS—Data Usage System" page. The NSM 100 may also expose GC/NSM API for DUS query to be consumed by troubleshooting and external applications. The NSM 100 may support enhanced query operation for call flows and enriched UI. The NSM 100 may also support Modify operations from NSM UI 102 and GC/NSM API to update the data usage counters information in NSM MBC.

Voicemail Function

The NSM 100 may support both VMAS and VMS. The NSM 100 may provide for creation of New Voicemail subscription in either of the two systems based on intent of the user specified by specifying source system. If no system is selected the VMAS system may be used as default.

Evolved Packet System (EPS)

The NSM 100 may support LTE attributes from subscriber's PGW profile from the EPS object.

Serving GPRS Support Node (SGSN)

The SGSN may be a main component of the GPRS network, which handles all packet switched data within the network. The SGSN may perform the same or similar functions as the Mobile Switching Centre (MSC) for voice traffic. A serving GPRS support node (SGSN) may be responsible for the delivery of data packets from and to the mobile stations within its geographical service area. The SGSN's tasks may include packet routing and transfer, mobility management (attach/detach and location management), logical link management, and authentication and charging functions. The location register of the SGSN may store location information (e.g., current cell, current VLR) and user profiles (e.g., IMSI, address(s) used in the packet data network) of all GPRS users registered with it.

Mobility Management Entity (MME) Interface

May provide subscriber MME registration status.

Over the Air (OTA) Function

The purpose of OTA may be to aid in the troubleshooting of subscriber accounts in OTA functions supported in the NSM 100.

Identity Access Management (IAM) Interface

The IAM 112 may handle subscriber access details, including customer profiles, passwords, privacy, permissions and link lines. The NSM interface from IAM 112 may access the information that IAM controls and give the ability to update and modify Subscriber data based on a user profile and permissions. The interface may be based on REST, with a JSON body, and the Authorization information in a dedicated HTTP header.

Charging System (CS) Interface

The Charging System (CS) Core elements may include AIR (Account Information and Refill) and SDP (Service Data Point). Certain NSM transactions interact with AIR via ACIP/UCIP protocol in the AIR which proxies the SDP based on the subscribers provisioned SDP location. For charging system integration, TPC may be used as interface endpoint for charging system where TPC will act as pass through for ACIP/UCIP requests. UCIP, which is the provisioning interface on AIR, may be used for user self-services such as Adjustments, Account refill, and Account enquiries and to extract account details in some scenarios. UCIP may be an IP-based protocol used for integration towards the AIR server from NSM. UCIP may be an XML over HTTP-based protocol, supporting event based clients. An UCIP request may be sent to one of the AIR servers within the network. The elements part of this protocol may be transferred using XML-RPC messages. ACIP (Account administration Communication Integration Protocol) may be an IP-based protocol used for integration towards the AIR server from the external administrative application. ACIP may an XML over HTTP based protocol, which may provide for integrating with a central integration point within a network. An ACIP request may be sent to one of the AIR servers within the network. The elements part of this protocol may be transferred using XML-RPC messages.

Messaging Interface

The NSM UI 102 may support NSM integration with CDB for Messaging applications. This interface may support provisioning and managing subscribers and its associated profiles in multiple messaging applications. NSM may support integration with the CDB interface for messaging application and will retrieve the common subscriber profile and the associated application specific profiles.

Secure Entitlement Server (SES)

The NSM 100 may integrate into the SES 110 to provide a unified interface for the customer care end user to maintain NSDS (Non SIM device Services) information for OEM and generic devices. This may enable the NSM 100 to view and manage service and device profile of a subscriber. By accessing the SES 110, the NSM 100 may provide for a user to Lock/unlock devices, delete services, delete devices, IP Sec tunnel tear down etc. In some embodiments, the NSM 100 may integrate with the SES using a RESTful interface for customer care service. The NSM 100 may provide a user interface from which the user may be able to query Subscriber details using either MSISDN, Owner ID, IMSI, Service Instance token, IMEI, EID, ICCID, Email, Username, EID, TMOID, DeviceId. The NSM 100 may provide UI or API function to enable the user to perform modify functions over the SES Interface.

Virtual MME (vMME)/MSSEARCH

The NSM 100 integration to the MME system may provide a unified interface for the NSM user to view and maintain the correct MME information for the subscribers. The interface may enable the NSM 100 to view the customer registration data and MME profile of a subscriber.

Provisioning Gateway (PGW)

The NSM 100 integration to the PGW system may provide a unified interface for the NSM user to view and maintain PGW information for the subscribers. The PGW may perform policy enforcement, packet filtering for each user, charging support, lawful interception and packet screening.

Network Access Point (NAP)

The NSM 100 may support the interface to the NAP platform to retrieve the customers service-oriented communications (SOC) and service levels.

Access and Mobility Function (AMF)

The NSM 100 may have integration with the AMF system, for example, over an SSH interface. The 5G Core Access and Mobility Management Function (AMF) may receive all connection and session related information from the User Equipment (UE) but may be responsible for handling connection and mobility management tasks. Messages related to session management may be forwarded to the Session Management Function (SMF).

Unified Data Management (UDM)

The UDM may provide services to other SBA functions, such as the AMF, SMF and NEF. The UDM may be a stateful message store, holding information in local memory. The UDM, however, may also be stateless, storing information externally within a Unified Data Repository (UDR). The UDM may be analogous to the Home Subscriber Server (HSS), providing authentication credentials while being employed by the AMF and SMF to retrieve subscriber data and context.

Figure 6:
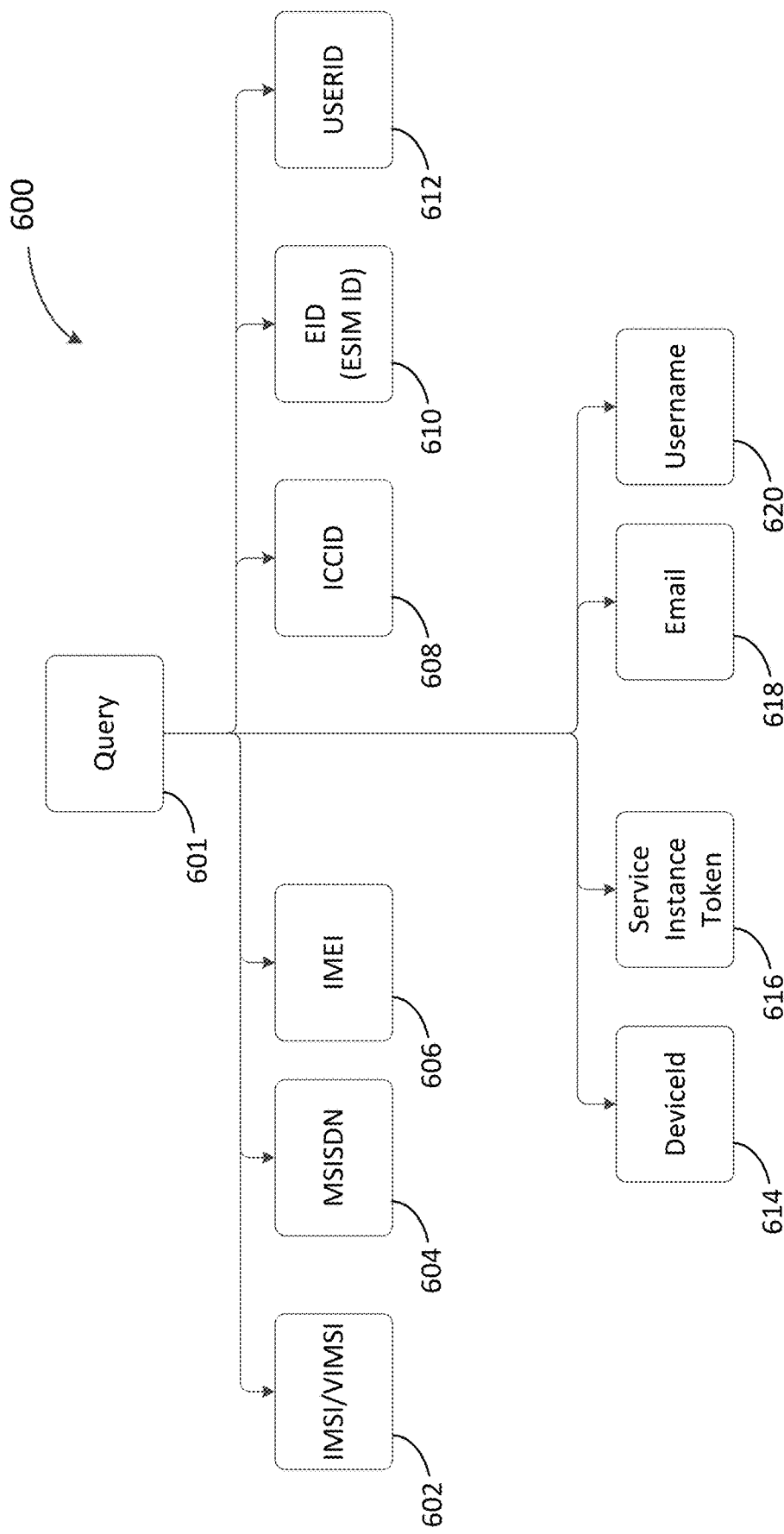
FIG. 6 is an embodiment of a diagram of query inputs that may be received in some embodiments of the network services manager in accordance with the disclosure.

Referring now to FIG. 6, in some embodiments, the NSM may provide for subscriber information to be searched using one of a variety of search criteria. Different systems or functions may store and handle subscriber information based on different identifying information. For example, while some systems may identify a subscriber account using a username, email, or user ID, others may identify an account or user equipment using an MSISDN, international mobile equipment identity (IMEI), integrated circuit card identifier (ICCID), etc. Traditionally, if a user or client, such as a customer care representative, only knew certain identifying information regarding a subscriber (i.e., a first subscriber identifier), it may have been difficult to access subscriber information on systems that may not use that particular type of subscriber identifier but only use a second subscriber identifier. Because the NSM 100 provides central access to potentially many different systems that may store subscriber information in different ways, in some embodiments, the NSM 100 may provide for receiving a first subscriber identifier from a client application and accessing information from systems that may not even use the type of received identifier. For example, the NSM 100 may receive, from a client application or user computing device, a first subscriber identifier and determine at least a second subscriber identifier associated with the same subscriber. In some embodiments, this process may be use to access one or more systems in order to provide whatever subscriber information that may be desired for a particular task.

FIG. 6 shows a flow chart 600 showing an embodiment of methods for determining subscriber information based on receiving any of a variety of subscriber identifiers. In some embodiments, various different query inputs 601 may be accepted via the NSM UI 102 from a user seeking information related to a particular subscriber. In some embodiments, a customer identifier may be entered into a field in the NSM UI 102 specific to the type of input entered, or may be a "smart" field that may receive any type of customer identifier. In some embodiments, the NSM UI 102 may include a subscriber identifier selection field that may receive a user's selection of a type of subscriber identifier to be entered (e.g., pull-down menu, list, etc.). Although not an exhaustive list, FIG. 6 shows various example inputs that the NSM 100 may receive as customer identifiers, such as International Mobile Subscriber Identity or virtual International Mobile Subscriber Identity (IMSI/VIMSI) 602 Mobile Station Integrated Services Digital Network (MSISDN) 604 (i.e., mobile telephone number), International Mobile Equipment Identity (IMEI) 606, Integrated Circuit Card ID (ICCID) 608, Endpoint Identifier (EID) 610, user identifier (US-ERID) 612, device identifier (DeviceID) 614, Service Instance Token 616, Email 618, and Username 620.

Figure 7:
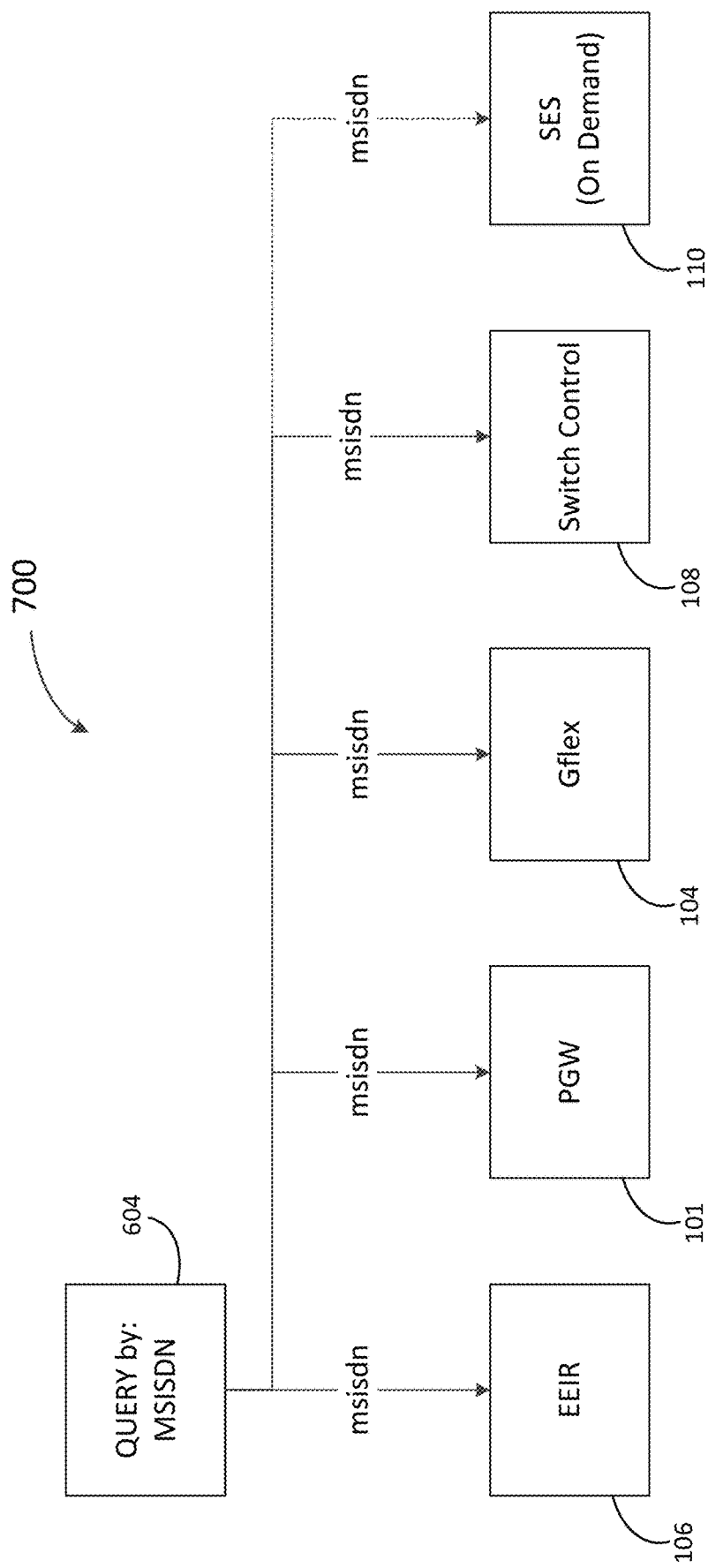
FIG. 7 is a partial flow diagram of external function systems that may be queried using the network services manager in accordance with the disclosure.

FIG. 7 shows a partial flow diagram 700 illustrating external function systems that may, in some embodiments, be queried for subscriber information by the NSM 100 using an MSISDN 604 associated with the particular subscriber as the subscriber identifier type. In some embodiments, the MSISDN 604 may be used to query at least the EEIR 106, PGW 101, GFLEX 104, and Switch Control 108, with information from the SES 110 "on demand." In some embodiments, screens in the NSM UI 102 dedicated to displaying data for a particular subscriber may include multiple screens in a tabular format. For inputs using subscriber identifier types that may be received by the PGW 101, for example, the default NSM UI 102 screen may be a PGW screen followed with an option of selecting tabs for other screens, such as the SES 110. In some embodiments, when the subscriber search is performed on the NSM UI 102 using query inputs receivable by the PGW 101, such as MSISDN 604, the PGW tab may be displayed at first (landing tab) with the PGW tab selected and populated already, with the SES tab being "on demand." In other words, a user may select the SES tab if desired. In some embodiments, when the search is performed on the NSM UI 102 using query inputs that may be receivable by the SES 110 or unique to the SES, the SES or "Service" tab may be selected and populated already with the other tabs, such as the PGW tab, being on demand.

Figure 8A:
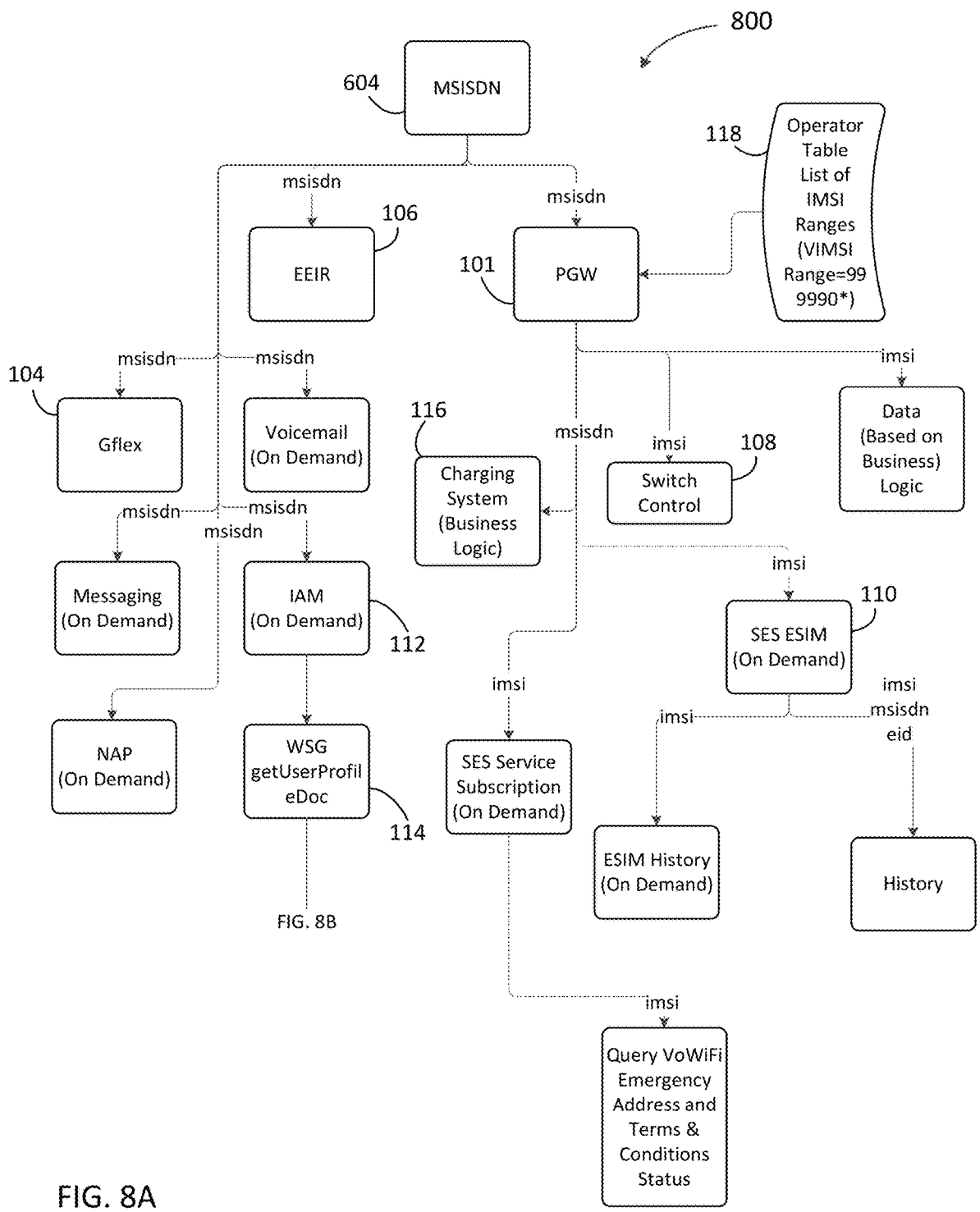
FIG. 8A is a data flow diagram for accessing external function systems with the network services manager in accordance with the disclosure.

FIG. 8A illustrates an embodiment of a data flow diagram 800 for accessing various particular external functions 85 when an MSISDN may be received as a query input at 601 through the NSM UI 102. In some embodiments, an MSISDN query input may be adapted to include on-demand queries to IAM and SES. In some embodiments, an associated IMSI may be extracted using a query to the PGW 101. The IMSI may be extracted from the PGW 101 by referencing an operator table 118, which may be stored at the PGW 101 or elsewhere in the core network. In some embodiments, the multi-branding operator table 118 may be updated to include a check mark/data column that may indicate a routing to query the SES instead of the PGW. The NSM 100 may then query the desired system as illustrated. In some embodiments, the NSM 100 may query a switch control 108 using the discovered IMSI, or other data logic based on provider business. The NSM 100 may also use the retrieved IMSI to query portions of the SES 110 or SES ESIM, such as upon an on-demand request via the NSM UI 102, or other related systems. The ESIM history may also be queried using the IMSI, and other SES history may be queried using IMSI, MSISDN, or EID. The IMSI may also be used to query an SES service subscription, such as to populate on-demand tabs in the NSM UI 102, and to query a VoWiFi emergency address and terms and conditions status system or database. In some embodiments, each of these systems may be queried via the PGW 101 to obtain different types of user or subscription data, as needed.

Figure 8B:
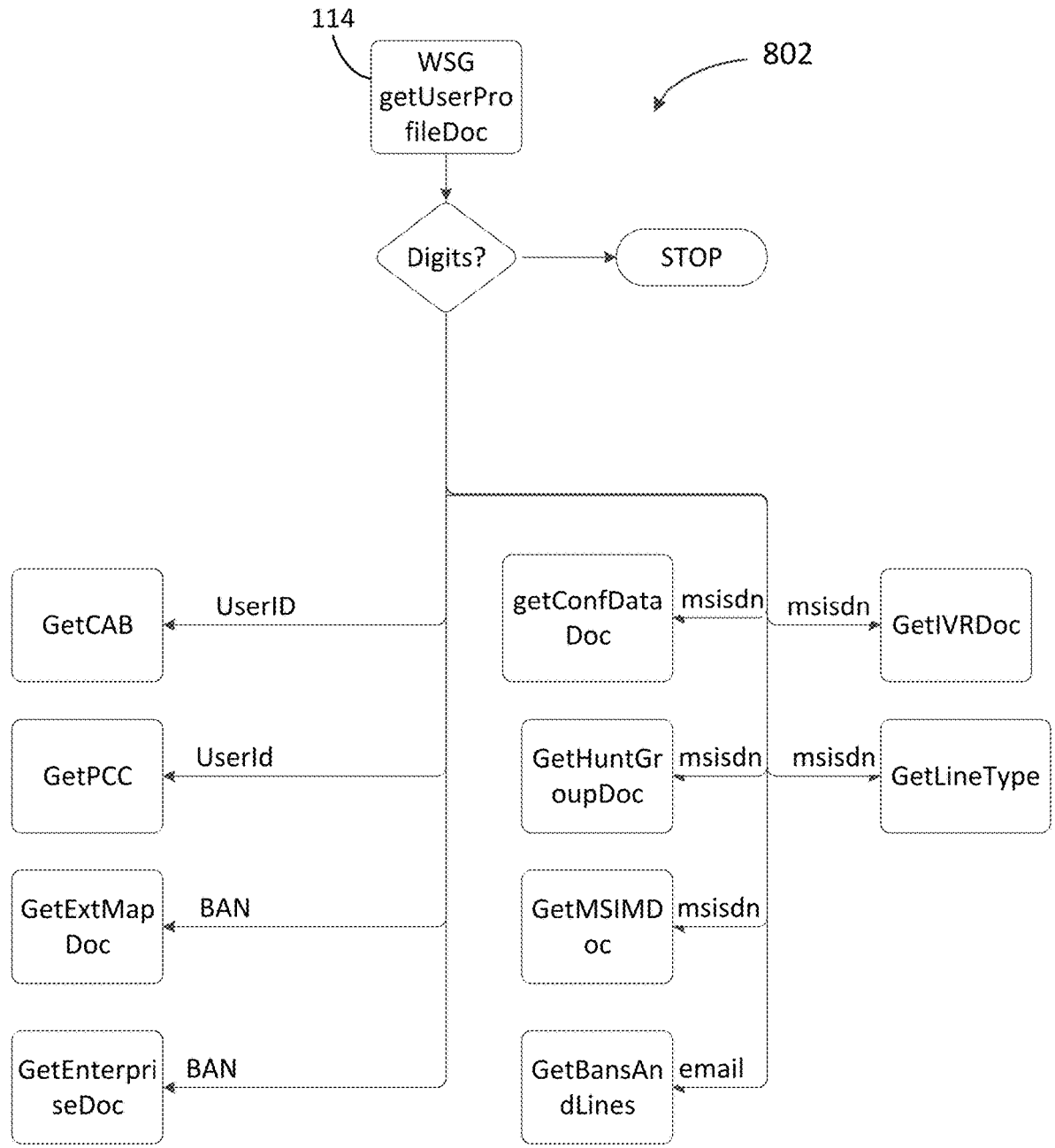
FIG. 8B is a continuation of the data flow diagram of FIG. 8A.

The MSISDN may also be used to query certain systems or databases directly, for on-demand user data or otherwise, such as the EEIR 106, the GFLEX 104, the IAM, messaging, voicemail, NAP, or by accessing data on the WSG 114, such as profile documentation. FIG. 8B illustrates a portion of data flow diagram 800 showing an embodiments of data flows relating to using the web services gateway (WSG) 114, usually via the IAM 112, to determine particular customer identifiers such as UserID, MSISDN, Email, etc. In some embodiments, the NSM 100 may retrieve a user email, UserID, and/or billing account number (BAN) through the WSG 1114. In some embodiments, the User ID may be used to access data using various HTTP commands, such as GETCAB, GETPCC, etc. A BAN may be used for certain commands, such as GETExtMapDoc, GETEnterpriseDoc, etc. The MSISDN may be used to directly query other data, such as using GETConfDataDoc, GetIVRDoc, GETHunt, GroupDoc, GETLineType, GETMSIMDoc, etc. In some embodiments, the user email may be used to retrieve data using commands such as GETBansAndLines. Those skilled in the art will recognize that these HTTP commands may differ in different systems without straying from the scope of the disclosure.

Figure 9A:
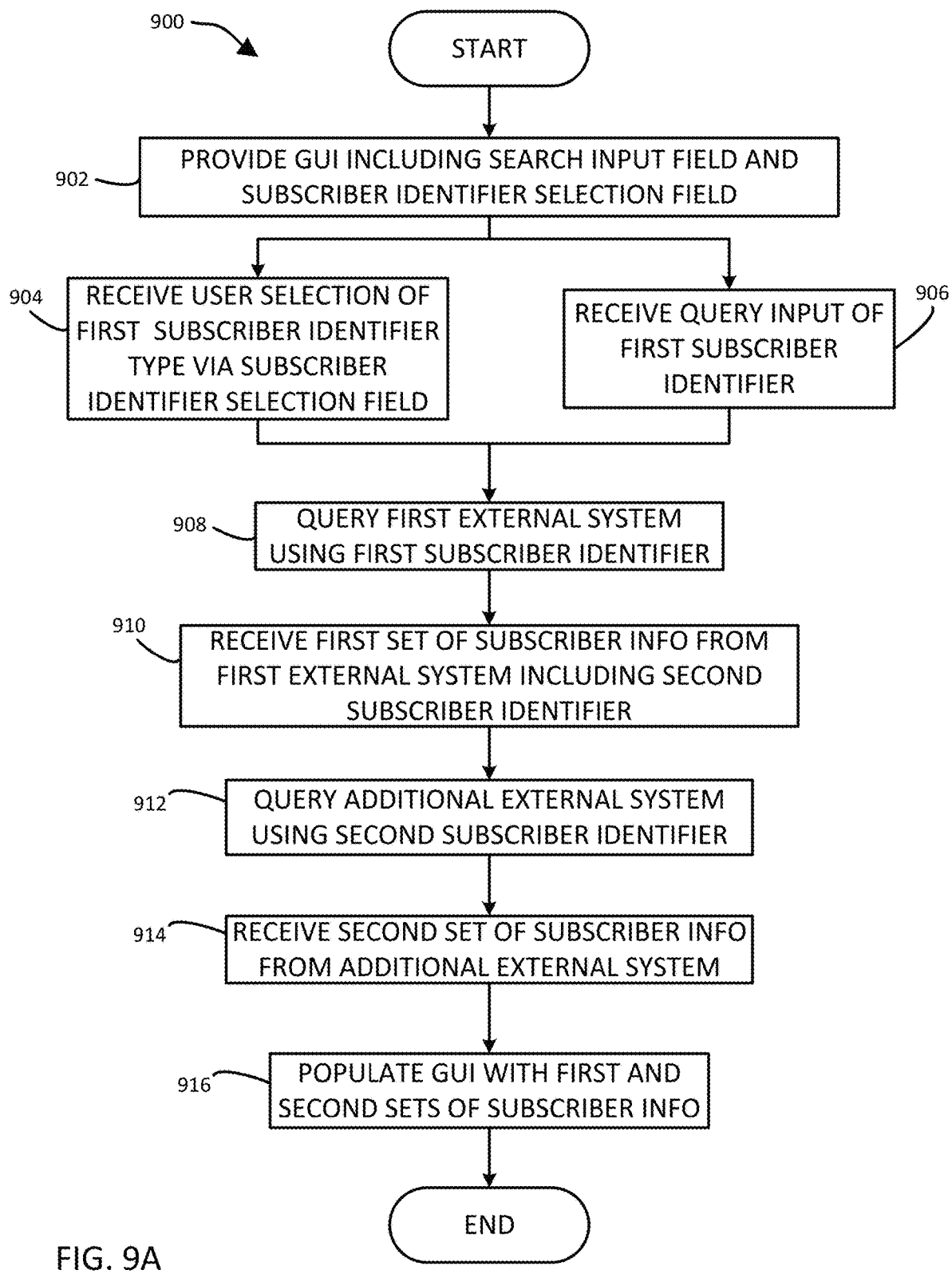
FIG. 9A is a flow chart of an embodiment of a method of using the network services manager in accordance with the disclosure.

FIG. 9A is a flow chart illustrating an embodiment 900 of a method of using the NSM 100 using the NSM GUI 102. Those skilled in the art will understand that a similar flow chart may show use of the NSM 100 using an API or REST API where queries may arrive via sources other than the NSM GUI 102. At 902, the method may include providing a GUI, such as the NSM GUI 102, including at least a search input field and a subscriber identifier field. In some embodiments, the subscriber identifier field may be the same as the search input field and the NSM may determine the type of subscriber identifier based on characteristics of the search input (e.g., number of characters, type of characters, etc.). At 904, the NSM 100 may receive a user selection of a first subscriber identifier type via the subscriber identifier field. For example, in some embodiments, the user may select MSISDN as the first subscriber identifier type. At 906, the NSM 100 may receive a query input of a first subscriber identifier associated with a subscriber for which a user seeks subscriber data (e.g., for troubleshooting or other purposes). At 908, based on the selection of the first subscriber identifier type, the NSM may determine which system of a plurality of external systems may receive that identifier type and query a first external system using the first subscriber identifier (e.g., the MSISDN). In some embodiments, the NSM 100 may query multiple external systems to retrieve various types of subscriber data using the first subscriber identifier.

At 910, in response to the query, the NSM may receive a first set of subscriber information from the first external system, where the first set of subscriber information may include a second subscriber identifier that is of a different subscriber identifier type than the first subscriber identifier type (e.g., IMSI). At 912, in response to receiving the second subscriber identifier, the NSM may query an additional external system using the second subscriber identifier. In some embodiments, the NSM 100 may query multiple additional external systems using the second subscriber identifier to retrieve various types of subscriber data available from those systems. At 914, in response to the query of the additional external systems, the NSM 100 may receive a second set of subscriber information from the additional system. In some embodiments, the second set of subscriber information may include a third subscriber identifier that may be used to query additional external systems for more subscriber information. At 916, the NSM 100 may populate the GUI, such as the NSM GUI 102, with the first and second sets of subscriber information and any additional subscriber information retrieved from additional external systems.

Figure 9B:
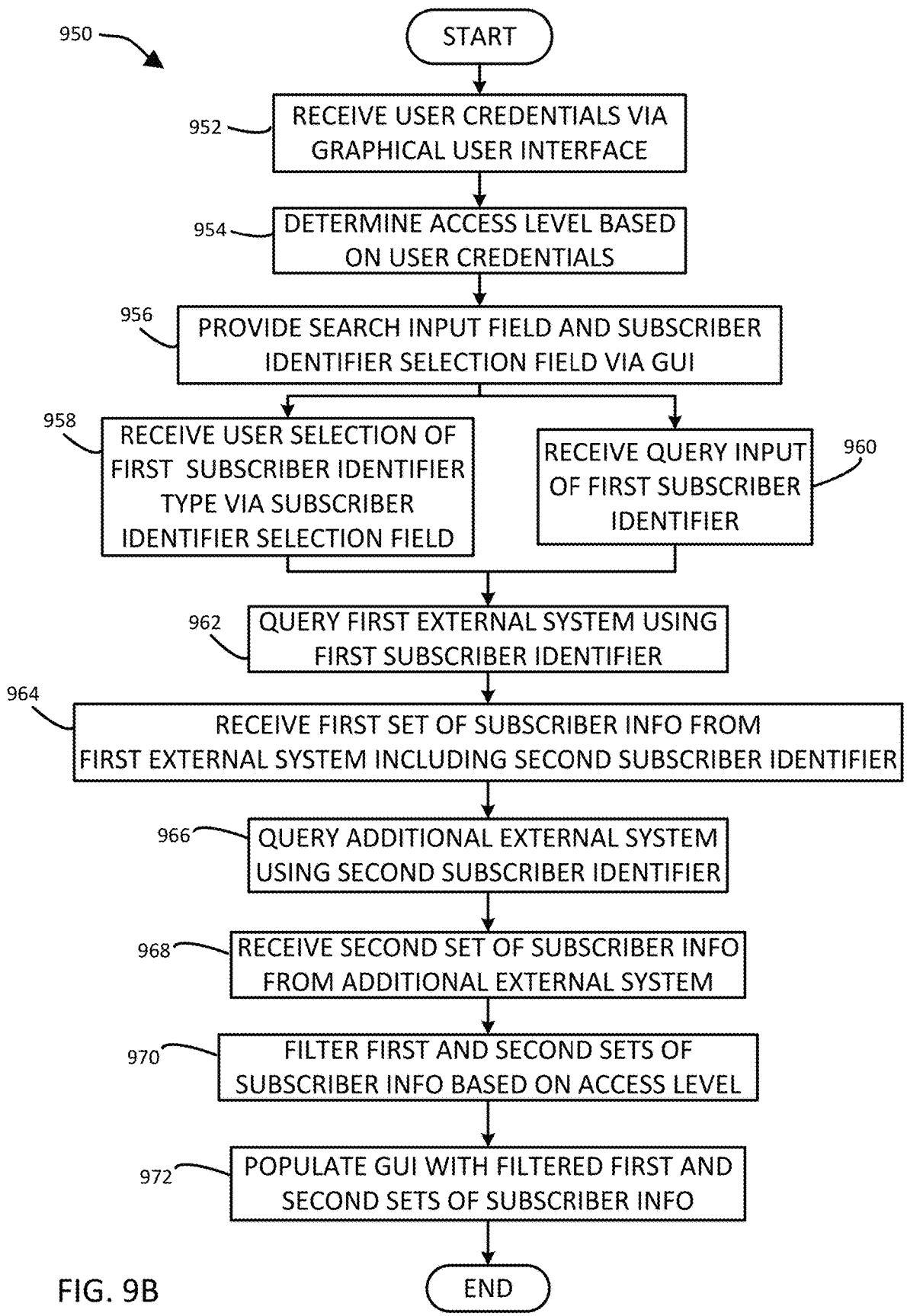
FIG. 9B is a flow chart of another embodiment of a method of using the network services manager in accordance with the disclosure.

FIG. 9B is a flow chart illustrating another embodiment 950 of a method of using the NSM 100 using the NSM GUI 102. Those skilled in the art will understand that a similar flow chart may show use of the NSM 100 using an API or REST API where queries may arrive via sources other than the NSM GUI 102. At 952, the method may include receiving user credentials via a GUI, such as the NSM GUI 102. User credentials may be any type of input for validating and/or authenticating a particular user or set of users, for example, username and password, biometric data, a PIN, public/private key combination, etc. In some embodiments, user credentials may be received via an API, particularly where an API may be used to access the NSM 100. At 954, the method may include determining a user access level based on the user credentials. The user access level for a particular user may dictate which type of subscriber access the user may have access to. For example, in some embodiments, a technician troubleshooting a subscriber's connection issues may have access to technical data such as device ID, type of plan, speed of plan, and other hardware information related to the subscriber or the subscriber's device, but may not have access to certain billing information. In another example, outside vendors that have been granted access to the NSM 100 may have limited access to subscriber information depending on the particular vendor's "need-to-know" regarding types of data. In some embodiments, each individual user may have an access level specific to that user that may be modified or adjusted by a system administrator.

At 956, the method may include providing a GUI, such as the NSM GUI 102, including at least a search input field and a subscriber identifier field. In some embodiments, the subscriber identifier field may be the same as the search input field and the NSM may determine the type of subscriber identifier based on characteristics of the search input (e.g., number of characters, type of characters, etc.). At 958, the NSM 100 may receive a user selection of a first subscriber identifier type via the subscriber identifier field. For example, in some embodiments, the user may select MSISDN as the first subscriber identifier type. At 960, the NSM 100 may receive a query input of a first subscriber identifier associated with a subscriber for which a user seeks subscriber data (e.g., for troubleshooting or other purposes). At 962, based on the selection of the first subscriber identifier type, the NSM may determine which system of a plurality of external systems may receive that identifier type and query a first external system using the first subscriber identifier (e.g., the MSISDN). In some embodiments, the NSM 100 may query multiple external systems to retrieve various types of subscriber data using the first subscriber identifier.

At 964, in response to the query, the NSM may receive a first set of subscriber information from the first external system, where the first set of subscriber information may include a second subscriber identifier that is of a different subscriber identifier type than the first subscriber identifier type (e.g., IMSI). At 966, in response to receiving the second subscriber identifier, the NSM may query an additional external system using the second subscriber identifier. In some embodiments, the NSM 100 may query multiple additional external systems using the second subscriber identifier to retrieve various types of subscriber data available from those systems. In some embodiments, the method may include determining which additional external systems may be queried based on the access level for a particular user. In some embodiments, some user access levels may not grant access to every external system. At 968, in response to the query of the additional external systems, the NSM 100 may receive a second set of subscriber information from the additional system. In some embodiments, the second set of subscriber information may include a third subscriber identifier that may be used to query additional external systems for more subscriber information. At 970, the method may include filtering first and second sets of subscriber information based on the user access level. In some embodiments, the result of the filtering may result in filtered first and second sets of subscriber information containing only the type of subscriber data that the particular user submitting the query may be authorized to access. Of course, in some embodiments, more than one additional external system may be queried resulting in more than just first and second sets of subscriber data. At 972, the method may include populating the GUI, such as the NSM GUI 102, with the filtered first and second sets of subscriber information such that the user may only access authorized data.

Figure 10:
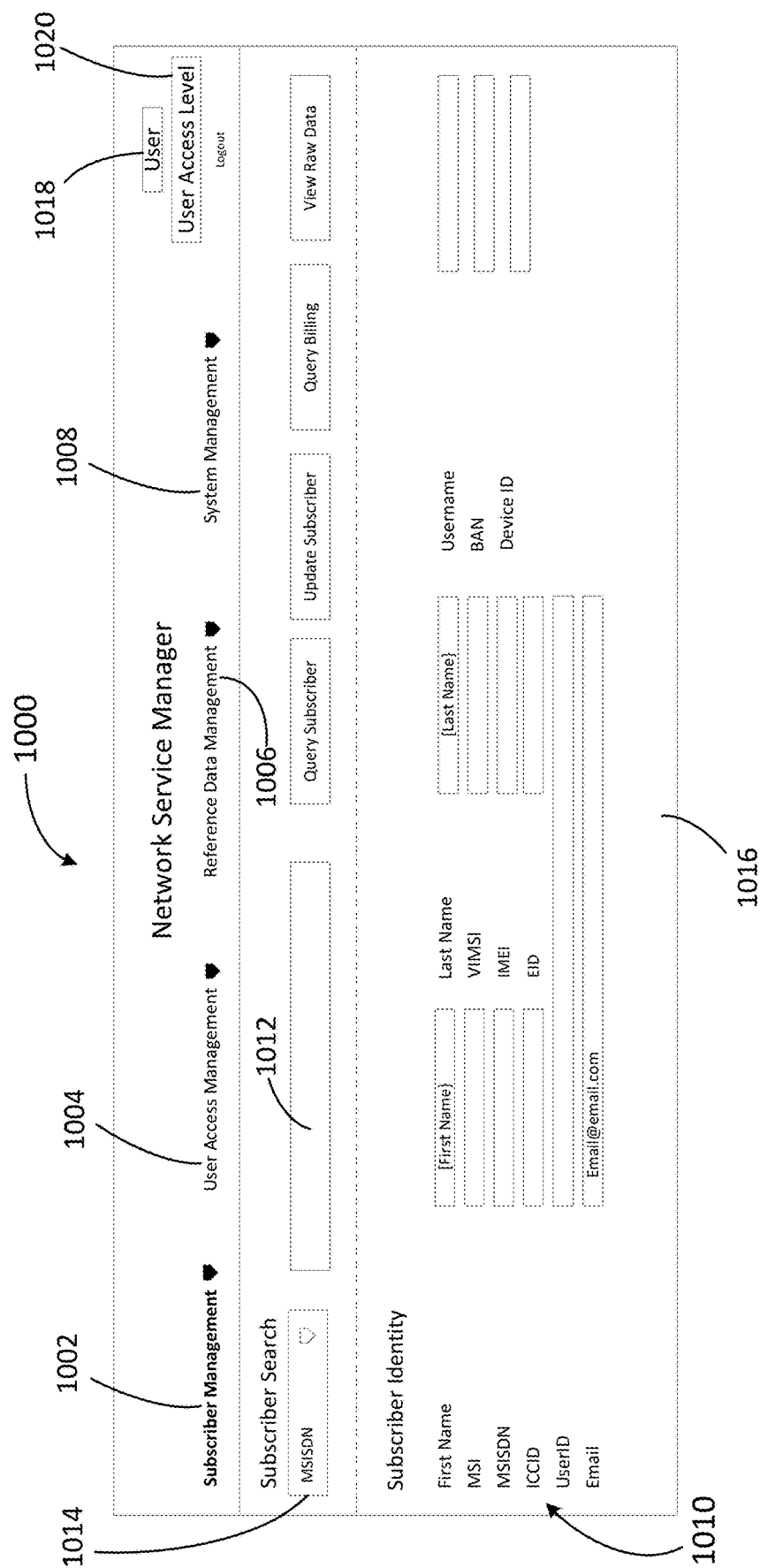
FIG. 10 is a screenshot of an embodiment of a graphical user interface (GUI) for the network services manager in accordance with the disclosure.

FIG. 10 is a screen shot of an embodiment of a graphical user interface (GUI) 1000 that may be used as or as part of the NSM UI 102 for a user, such as a customer service representative of a cellular network provider, may use to access the NSM 100 to determine information regarding a particular network customer or subscriber. In some embodiments, the GUI 1000 may include several general menus, such as Subscriber Management 1002, User Access Management 1004, Reference Data Management 1006, and System Management 1008 that may be accessed by properly permissioned users. In some embodiments, certain menus, options, or subscriber information may not be available to certain classes of users as determined by a permission determination based upon user login credentials. FIG. 10 shows an embodiment of a subscriber search screen 1010 that may be available under the Subscriber Management 1002 menu. The subscriber search screen 1010 may include a subscriber search input field 1012 for receiving a user input of a customer identifier. In some embodiments, the subscriber search screen 1010 may include a customer or subscriber identifier selection field 1014, which may be a pull down menu or other suitable selection mechanism. In some embodiments, a user may select a particular type of customer identifier (e.g., MSISDN) using the subscriber identifier selection field 1014, and enter a subscriber identifier query input into the subscriber search input field 1012. In some embodiments, the NSM 100 may receive the subscriber identifier query input and, for example, perform the search methods illustrated in the flow charts in FIGS. 9A and 9B. Some or all of the results of the subscriber search may be returned and shown in a subscriber identity screen 1016, which may include various fields to show subscriber information (e.g., first name, last name, IMSI, ICCID, UserID, Email, VIMSI, EID, Username, BAN, DeviceID, etc.). Those of skill in the art will understand that the screen shot shown in FIG. 10 is just one possible embodiment of a GUI 1000 that may receive search inputs and display subscriber information in accordance with the disclosure. The GUI 1000 may also include a user indicator 1018 identifying the user who is logged into the NSM 100, and may include a user access level indicator 1020 that may identify the access level or group to which the particular user belongs. In some embodiments, the access level indicated may determine the type of subscriber data to which the user may have access through the NSM 100. In some embodiments, information retrieved using the methods shown and described related to FIGS. 9A and 9B may be used to fill in the IAM search screen 1024.

Figures 11A, 11B:
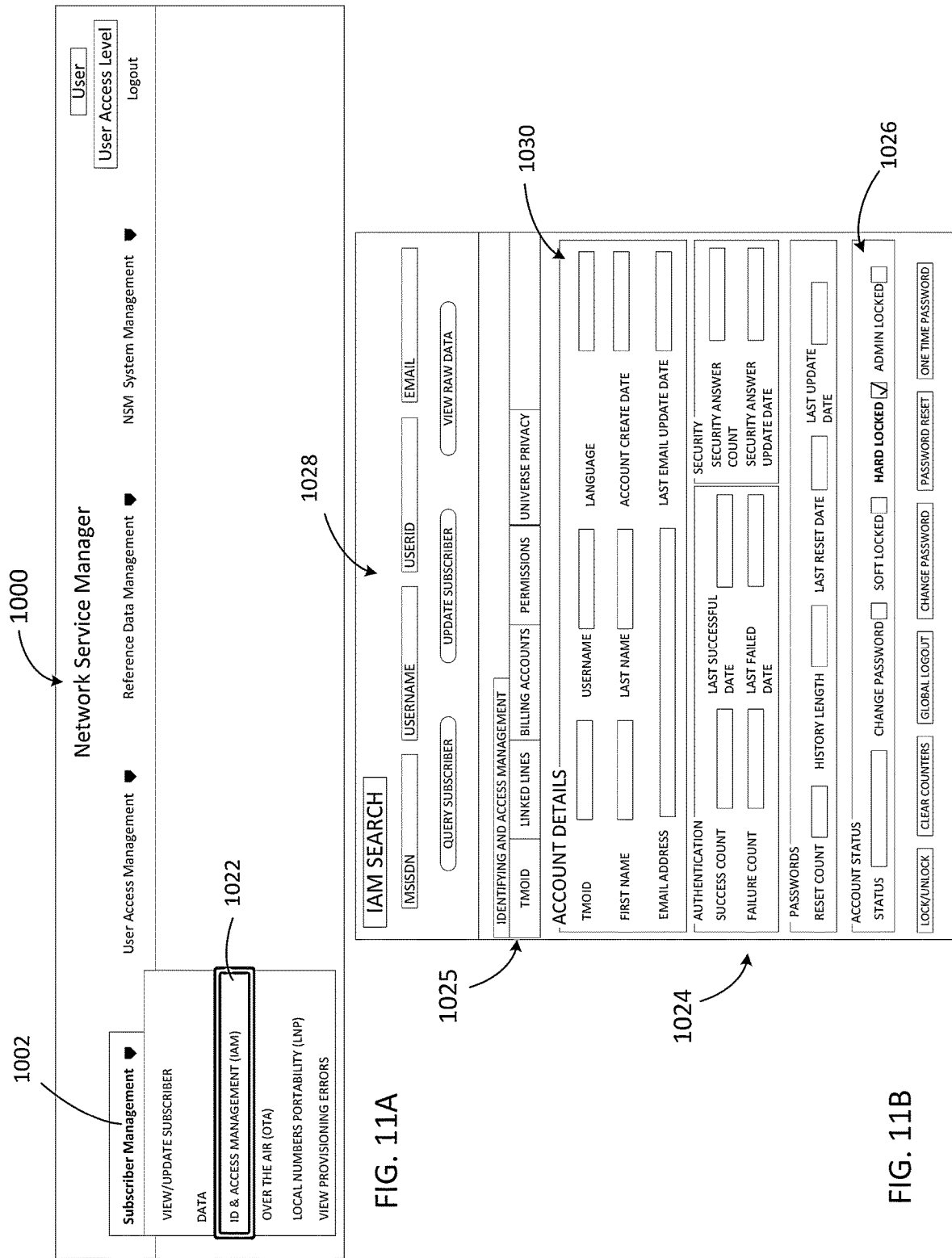
FIG. 11A is a screenshot of an embodiment of the GUI of FIG. 10.
FIG. 11B is a screenshot of an embodiment of the GUI of FIG. 10.

FIG. 11A illustrates a screenshot of the GUI 1000 that shows several selections that may be available under the Subscription Management menu 1002 in some embodiments. One option may be the ID & Access Management (IAM) system of function 1022, which may provide access to searching the IAM system and display an IAM search screen and associated tabs. FIG. 11B illustrates a screenshot of one embodiment of an IAM search screen 1024. Along with the standard query that will query the IAM to fill out the individual functional applications data fields, a user may select check boxes 1026 in the GUI 1000 and may request updates of the subscription. The IAM search screen 1024 may include one or more fields 1028 for entering a query input, such as MSISDN, Username, UserID, Email, etc. An Account Details screen 1030 may be updated as part of a standard 'View/Update Subscriber' query based on the msisdn/imsi/iccid/imei queried and may utilize the IAM APIs to fill the relevant subscription data. In some embodiments, a user may select check boxes in the GUI 1000 and request update of the subscription. In some embodiments, a user may select and copy any text in the user interfaces. In some embodiments, a raw data function may retain the list of data returned for operations performed in the session whether there is mapping in the NSM 100 for the attributes returned from the southbound system or not for the individual subscriber account being accessed. In some embodiments, when a new subscriber account is queried, the raw data may be purged from the previous session. In some embodiments, when a GUI access timer times out, the raw data cache may also be purged. In some embodiments, information retrieved using the methods shown and described related to FIGS. 9A and 9B may be used to fill in the IAM search screen 1024.

In some embodiments, upon entering a query input of a subscriber identifier into one of the fields, the NSM 100 may perform a search using the methods shown and described related to FIGS. 9A and 9B, and may be used to fill in the IAM search screen 1024. In some embodiments, information returned by the IAM search may include a network ID, username, first name, last name, language, email, etc. In some embodiments, the IAM search screen 1024 may also include tabs 1025 for other information related to a subscriber, such as Linked Lines, Billing Accounts, Permissions, and Universe Privacy. In some embodiments, the IAM search screen 1024 may also allow permissioned users to edit particular information regarding a subscriber account, such as locking/unlocking an account, resetting counters, changing a password, or providing a one-time password.

Figure 12:
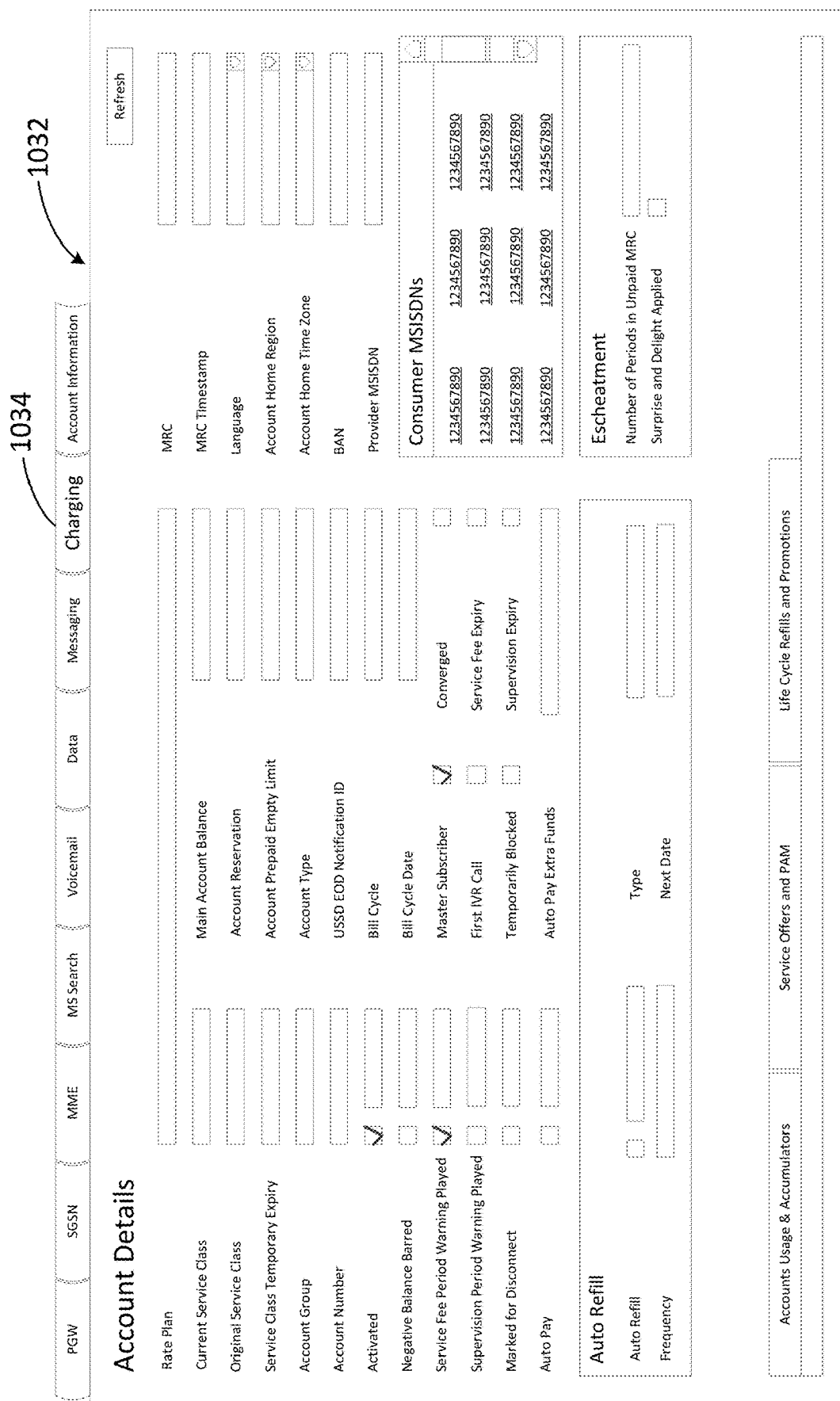
FIG. 12 is another screenshot of an embodiment of the GUI of FIG. 10.

FIG. 12 illustrates a screenshot of one embodiment of an Account Details screen 1032 that may be included in the NSM GUI 1000 for accessing information on the Charging System (CS), such as by selecting a Charging tab 1034. In some embodiments, various types of subscriber information may be available on the Account Details screen 1032, such as the subscriber's rate plan, service class, account group, account number, activation information, account balance, home region, etc. The Account Details screen 1032 may be populated based on a user search of the NSM 100 using the NSM UI 102 or an API associated with an internal application 80. In some embodiments, information retrieved using the methods shown and described related to FIGS. 9A and 9B may be used to fill in the Account Details screen 1032.

FIG. 13 illustrates a screenshot of one embodiment of an Service screen 1036 that may be included in the NSM GUI 1000 for accessing information on the SES, such as by selecting an SES tab 1038. It should be understood by those skilled in the art that other systems may also be accessed via corresponding tabs in the NSM GUI, such as USD, CS, Data, Messaging, SES, IAM, Voicemail, MS Search, MME SGSN, Account Information, etc. In some embodiments, various types of subscriber information may be available on the Service screen 1036, such as service names, device names, etc. Users with the requisite access level to do so may be able to use the Service screen 1036 to add or delete a service or a device to or from a subscriber's account. In some embodiments, information retrieved using the methods shown and described related to FIGS. 9A and 9B may be used to fill in the Service screen 1036.

FIG. 14 illustrates a screenshot of one embodiment of an AMF Info screen 1040 that may be included in the NSM GUI 1000 for accessing information on the AMF, such as by selecting an AMF tab 1042. In some embodiments, various types of information relevant to a subscriber's account may be available on the AMF Info screen 1040, such as AMF identity, AMF hostname, AMF status, registration status for 5G, Data network information, etc. In some embodiments, information retrieved using the methods shown and described related to FIGS. 9A and 9B may be used to fill in the AMF Info screen 1040. In some embodiments, a user may use the NSM GUI 1000 to determine registration attributes that may relate to 5G network customers, such as through querying an AMF. In some embodiments, an NSM API may be used to present 5G network responses. In some embodiments, the NSM may also provide an available list for UDM APNs. In some embodiments, the NSM may include additional elements that may be specifically related to 5G network customers, such as "five5NonStandalone" and fiveGRadio" elements in a subscriber search query response. In some embodiments, "fiveGNonStandalone" may be part of a "customerStatus" object, and some possible values for "fiveGNonStandalone" may be "Not Capable," "Blocked," "Provisioned and Not-Available," etc. The "fiveGRadio" element may be part of the "HLR" object. Accordingly, if a subscriber is queried such as via the flows in FIGS. 9A and 9B using the MSISDN or other subscriber identifier, certain subscriber information or elements may be returned or populated into the NSM, such as those elements that may be specific to 5G services.

Figure 15:
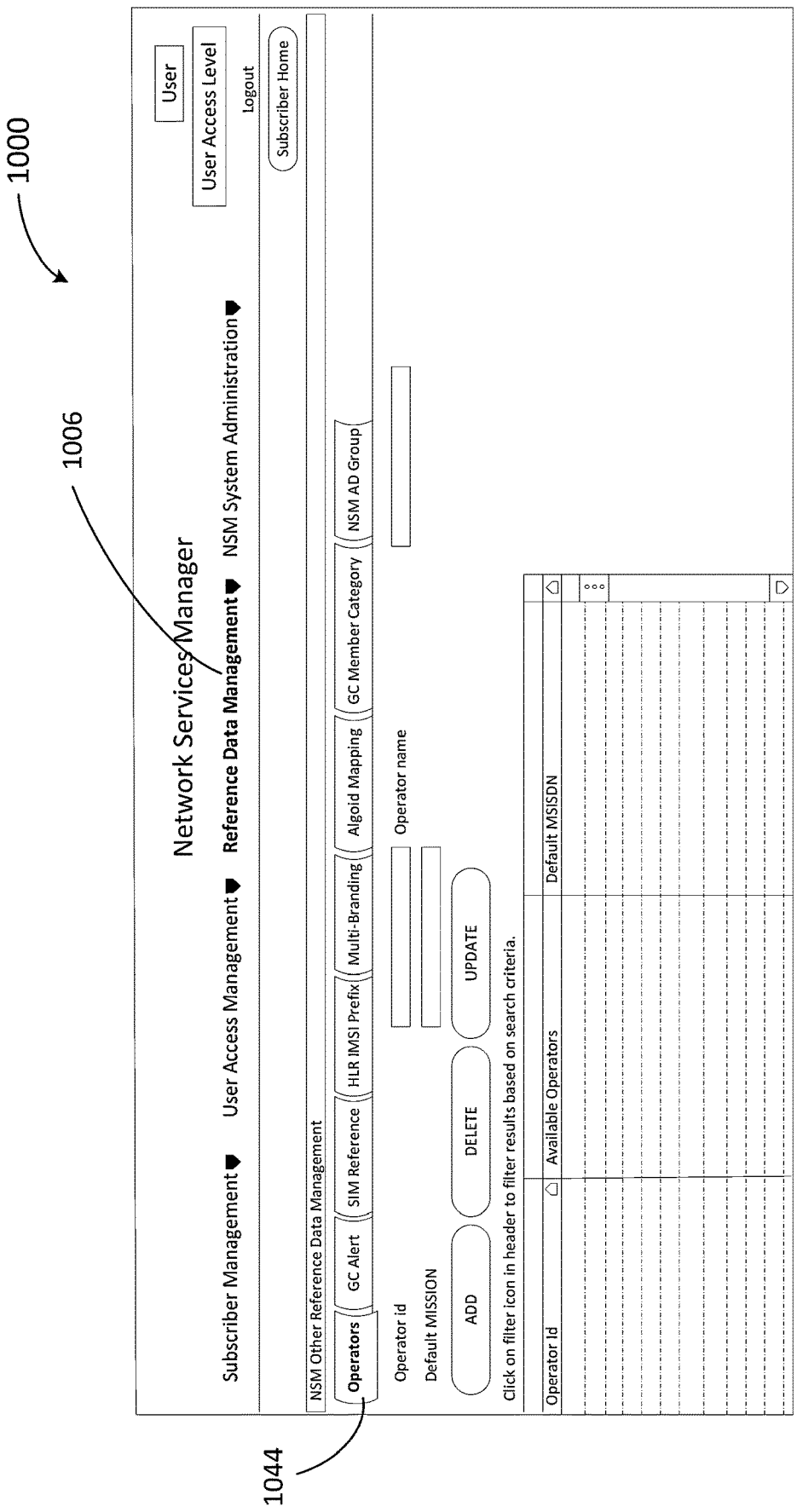
FIG. 15 is another screenshot of an embodiment of the GUI of FIG. 10.

FIG. 15 illustrates a screenshot of an embodiment of an Operators screen 1044 that may be included in the GUI 1000 for accessing information related to operators in the Reference Data Management menu 1006. Other tabs may be available for selection in the Reference Data Management menu 1006, such as SIM Reference, HLR IMSI Prefix, Multi-Branding, Algoid Mapping, NSM AD Group, etc. In some embodiments, the Operator screen 1044 may provide a user with information related to cellular network operators, such as default MSISDN, Operator ID, etc. In some embodiments, a user with the proper access level may add, delete, or update operator data in the NSM 100 reflected in the Operator screen 1044. In some embodiments, information retrieved using the methods shown and described related to FIGS. 9A and 9B may be used to fill in the Operators screen 1044.

Figure 16A:
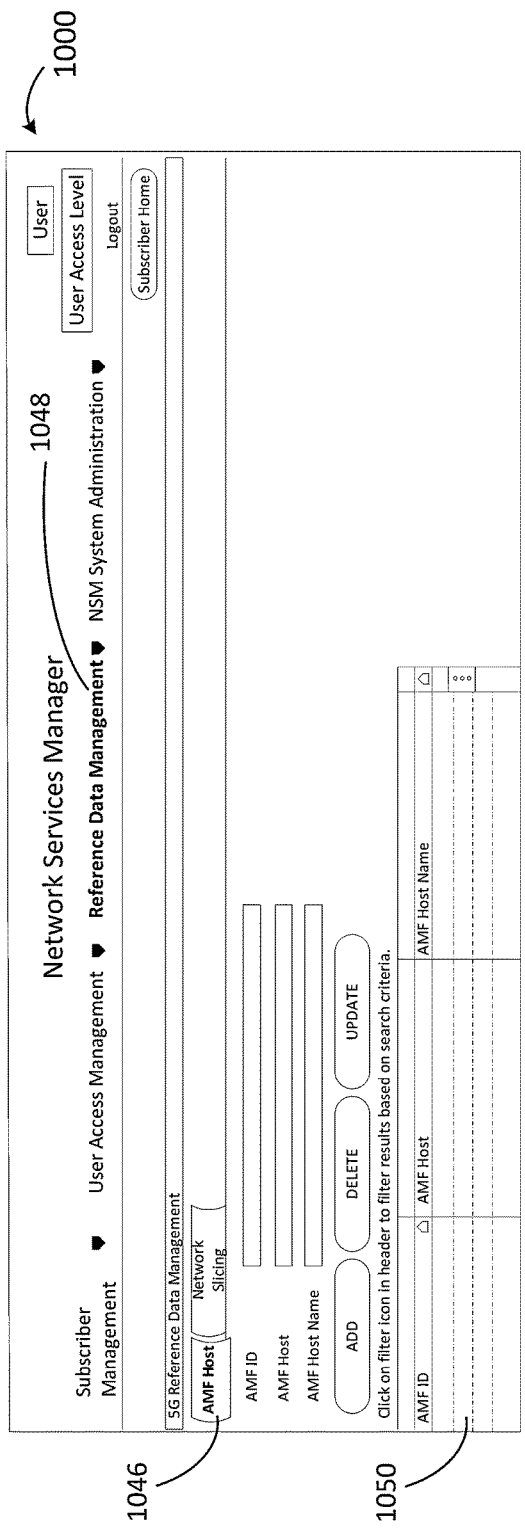
FIG. 16A is another screenshot of an embodiment of the GUI of FIG. 10.
Figure 16B:
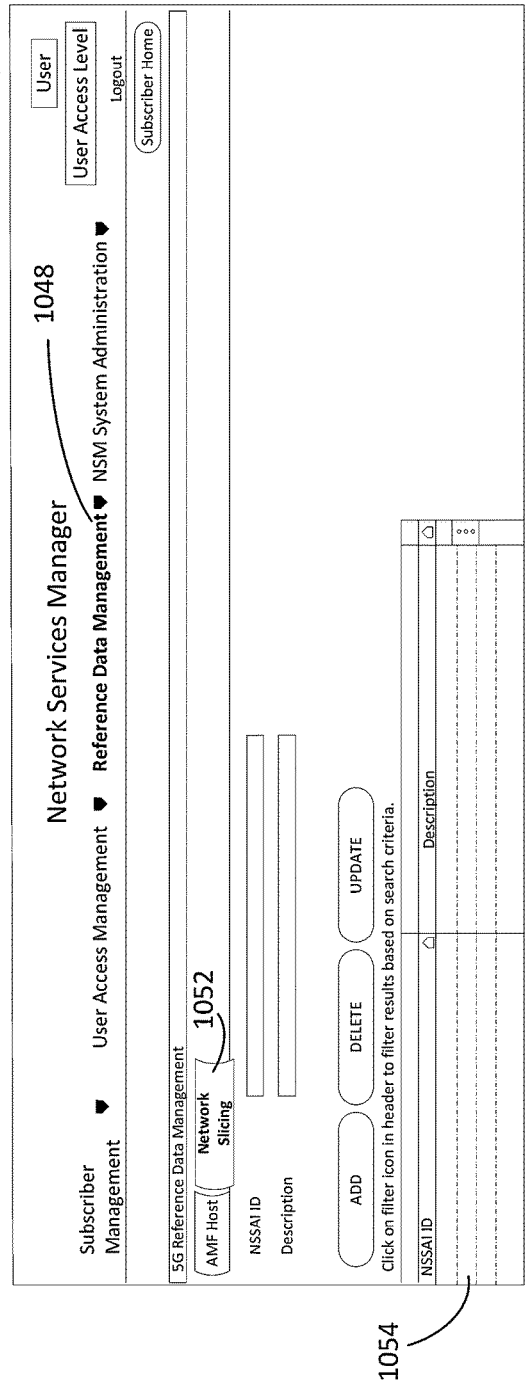
FIG. 16B is another screenshot of an embodiment of the GUI of FIG. 10.

FIGS. 16A and 16B illustrate screenshots of an embodiment of a 5G Reference Data Management menu 1048 that, in some embodiments, may be specific to 5G network information. In some embodiments, as shown in FIG. 16A, an AMF Host screen 1046 may be provided and may include Add, Delete, and/or Update buttons that may provide a user with options to add, remove, or edit information such as AMF ID, AMF Host, and AMF Host name. In some embodiments, the AMF ID may be uniquely mapped with AMF MMNET, the AMF Host may store the IP/URL of the relevant AMF, and the AMF Host Name may be the host name for the relevant AMF. An AMF list field 1050 may display existing AMF IDs and corresponding information for selection, editing, deletion, etc. In some embodiments, information retrieved using the methods shown and described related to FIGS. 9A and 9B may be used to fill in the AMF Host screen 1046. In some embodiments, as shown in FIG. 16B, the 5G Reference Data Management menu 1048 may also include a Network Slicing screen 1052. The Network Slicing screen 1052 may include buttons to add, delete, and/or update information relating to the network slice selection assistance information (NSSAI) ID and their corresponding description. In some embodiments, the NSSAI ID may be used to uniquely identify a network slice, such as in a 5G network. The Network Slicing screen 1052 may also include an NSSAI list field 1054 that may display existing NSSAI IDs and their corresponding descriptions for selection, editing, removal, etc.

Figure 17:
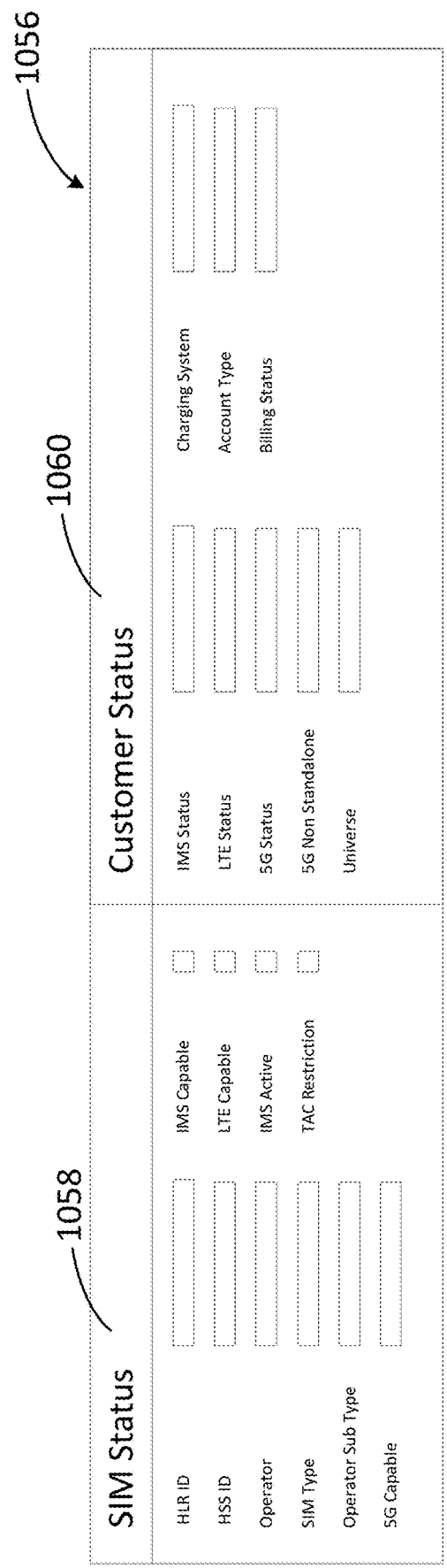
FIG. 17 is an embodiment of a status screen of the GUI of FIG. 10.
Figure 18:
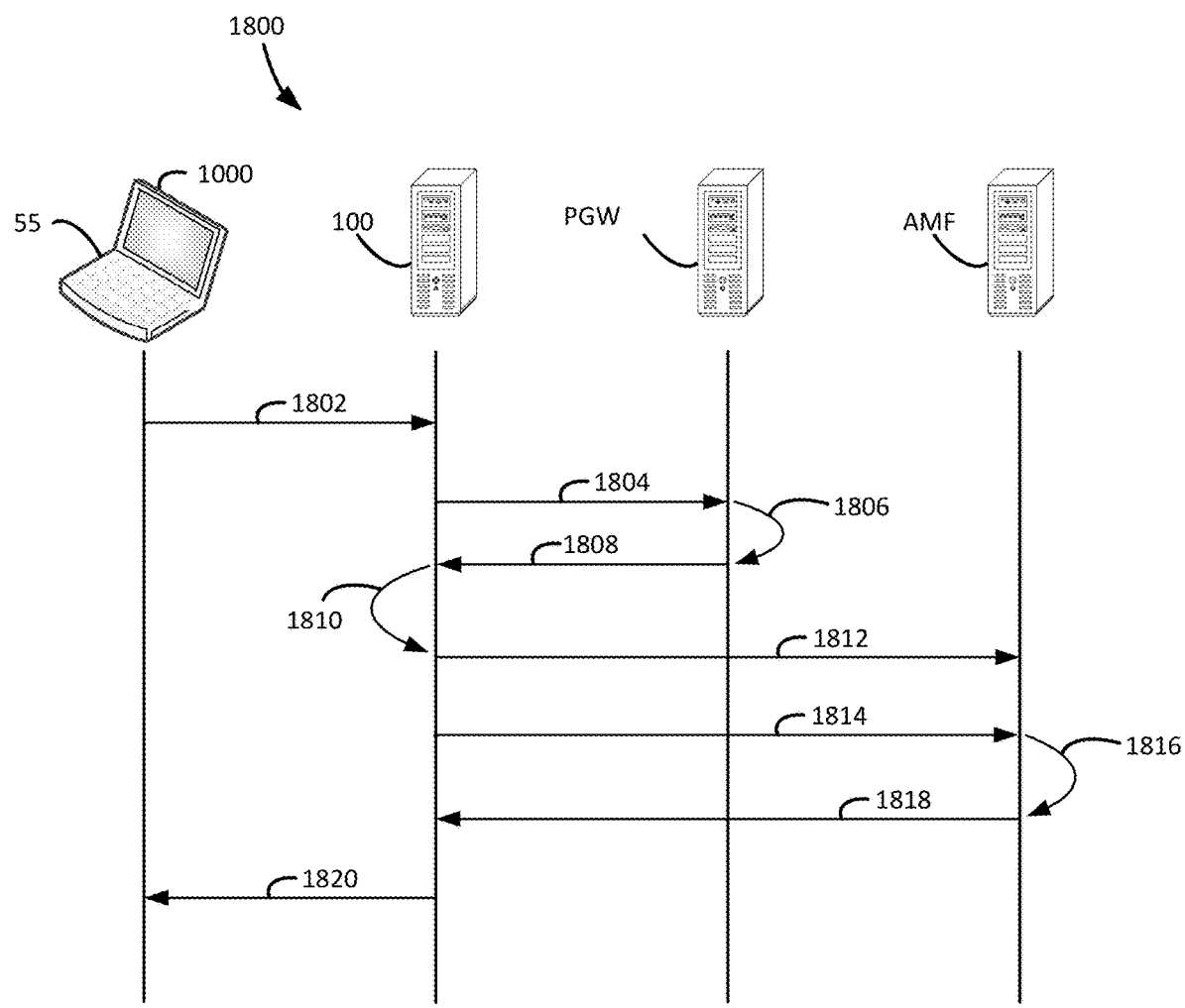
FIG. 18 is an embodiment of a data flow diagram in accordance with the disclosure.

FIG. 17 illustrates a screenshot of an embodiment of a Status screen 1056 that may be accessible as part of the NSM GUI 1000 in some embodiments. The status screen 1056 may include a SIM Status portion 1058 and a Customer Status portion 1060. In some embodiments, the SIM Status portion 1058 may include fields that may be particular to a subscriber identity module (SIM), such as HLR ID, HSS ID, Operator, SIM Type, Operator Sub Type, 5G Capable, IMS Capable, LTE Capable, IMS Active, TAC Restriction, etc. In some embodiments, the Customer Status portion 1060 of the Status screen 1056 may include fields that may be particular to a customer (e.g., a customer corresponding to the SIM), such as IMS Status, LTE Status, 5G Status, 5G Non Standalone, Universe, Charging System, Account Type, Billing Status, etc. In some embodiments, similar fields may also be included in the NSM API so at to provide access to or convey customer data via the NSM API. In some embodiments, the source for whether the SIM may be 5G Capable may be a PGW. In some embodiments, the 5G status may be sourced from a UDM or via a UDM PGW API call. FIG. 18 illustrates an embodiment of a data flow diagram 1800 that may be used to populated portions of the NSM GUI 1000, such as the AMF tab 1042 shown and described related to FIG. 14. At 1802, a query may be made, for example, from the AMF tab 1042 in the NSM GUI 1000, for subscriber or AMF host information. The NSM GUI 1000 or NSM UI 102 may be running on a computing device, such as a user computing device 55. In some embodiments, a subscriber MSISDN and/or IMSI may be entered into the appropriate field in the AMF tab 1042, which may be received by the NSM 100. At 1804, the NSM 100 may query a PGW, such as PGW 101 using the MSISDN and/or IMSI. At 1806, the PGW 101 may identify and, at 1808, return an identifier to the NSM, such as an AMF identifier (AMFID). At 1810, the NSM 100 may identify and/or retrieve information, such as AMF host details, based on the AMFID. In some embodiments, at 1812, the NSM 100 may connect to the AMF identified by the AMFID. At 1814, once connected to the identified AMF, the NSM 100 may run an AMF command for the MSISDN and/or IMSI queried. At 1816, the AMF may retrieved the AMF data and, at 1818, the NSM 100 may receive the AMF response to the query. At 1820, the NSM 100 may populate the AMF tab 1042 in the NSM GUI 1000 or UI 102, such as by populating the fields in the AMF Info Screen 1040 as shown in FIG. 14.

Figure 19:
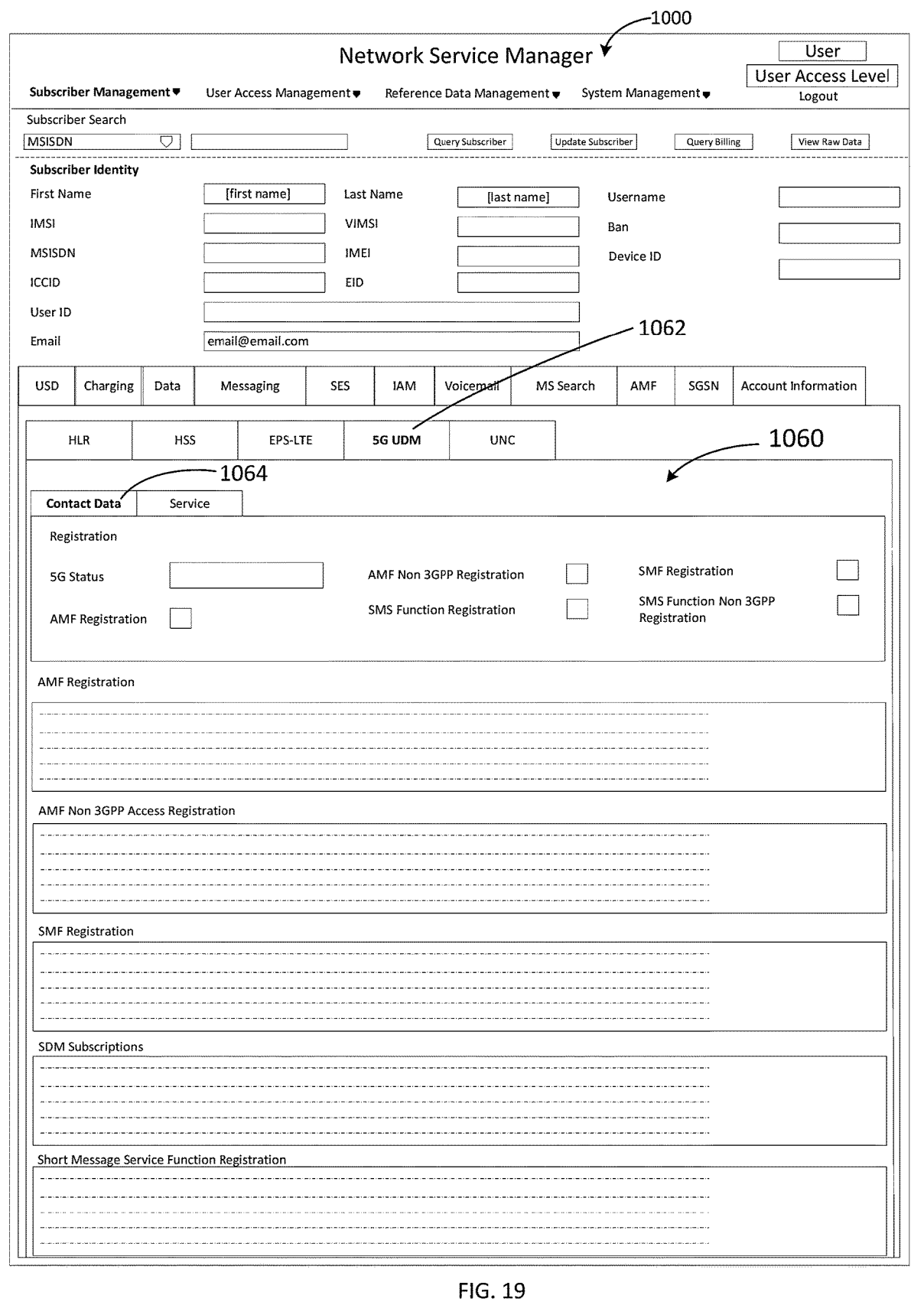

FIG. 19 illustrates a screenshot of one embodiment of a 5G UDM Info screen 1060 that may be included in the NSM GUI 1000 for accessing information on the UDM, such as by selecting a 5G UDM tab 1062. In some embodiments, the 5G UDM tab 1062 may present subscriber 5G information from the PGW (e.g., 5G DNNs). In some embodiments, a user may select assign APNs that may populate under an APN detail section of the NSM UI 100. In some embodiments, an Available APN list may populate APNs from an data table of APNs logged in a user group. In some embodiments, the user may be able to select one or more APNs and add/remove the APNs from an available/assigned list. In some embodiments, once a user adds or removes APNs from a provisioned APN list, the user may select the "update subscriber button" to updated the list of APNs on the PGW.

In some embodiments, various types of information relevant to a subscriber's account may be available on the 5G UDM Info screen 1060, which may be under Contact Data tab 1064 and/or Service Tabs. Information in the contact data tab 1064 may include status, AMF Registration, AMF Non 3GPP Access Registration, SMF Registration, SDM Registration, SDM Subscriptions, Short Message Service Function Registration, Short Message Service Function Non 3GPP Access Registration, UDM Subscriptions, UDM Customer data, ODB data, operator specific data, etc. In some embodiments, information retrieved using the methods shown and described related to FIGS. 9A and 9B may be used to fill in the AMF Info screen 1040.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++ or Perl using, for example, conventional or object-oriented techniques. In some examples, the at least one processor may be specifically programmed.

The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed (or physically configured) to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the system and the methods described herein may be configured to efficiently provide for efficient, easily transportable and remotely accessible coordination and completion of quality assurance activities. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method for managing network services for a cellular network provider, the method comprising:
    providing a graphical user interface (GUI) including at least one search input field and a subscriber identifier selection field;
    receiving, via the GUI, a user selection of a mobile station integrated services digital network (MSISDN) identifier type via the subscriber identifier selection field and a query input of an MSISDN number associated with a subscriber;
    based on the user selection of the MSISDN identifier type, querying a provisioning gateway (PGW) using the MSISDN number received via the GUI;
    in response to querying the PGW using the MSISDN number, receiving, from the PGW, a first set of subscriber information associated with the subscriber, the first set of subscriber information including an international mobile subscriber identity (IMSI) number associated with the subscriber;
    in response to receiving the IMSI number, querying at least one additional system using the IMSI number;
    in response to querying the at least one additional system using the IMSI number, receiving, from the at least one additional system, a second set of subscriber information associated with the subscriber; and
    populating one or more fields of the GUI with the first and second set of subscriber information.

2. The method of claim 1, wherein the at least one additional system queried using the IMSI number is at least one of a switch control server or a secure entitlement server (SES).

3. The method of claim 1, wherein the user selection is made by a user, and further comprising:
    receiving user credentials for the user;
    determining an access level for the user based on the user credentials;
    filtering the first and second set of subscriber information based on the access level for the user; and
    populating the GUI with the filtered subscriber information.

4. The method of claim 1 further comprising:
    querying at least one additional system using the MSISDN number; and
    in response to querying the at least one additional system with the MSISDN number, receiving a third set of subscriber information associated with the subscriber.

5. The method of claim 4, wherein the at least one additional system queried using the MSISDN number is at least one of an enhanced equipment identity register (EEIR), a home location register (HLR), an identity and access management (IAM) system, or a charging system (CS).

6. The method of claim 1, wherein the PGW retrieves the IMSI number associated with the subscriber from an operator table stored at the PGW.

7. The method of claim 1 further comprising:
    querying an identity and access measurement (IAM) system using the MSISDN number; and
    in response to querying the IAM system, receiving a UserID associated with the subscriber.

8. The method of claim 7 further comprising receiving a third set of subscriber information in response to a query using the UserID.

9. A computer-implemented method for managing network services for a cellular network provider, the method comprising:
    receiving, via a graphical user interface (GUI), a query input of a mobile station integrated services digital network (MSISDN) number associated with a subscriber;
    querying a first external system using the MSISDN number;
    in response to the query of the first external system, receiving a first set of subscriber information;

querying a second external system using the MSISDN number to determine an international mobile subscriber identity (IMSI) number associated with the subscriber;

querying a third external system using the IMSI number;

in response to the query of the third external system with the IMSI number, receiving a second set of subscriber information; and populating one or more fields of the GUI with the first and second set of subscriber information.

10. The method of claim 9, wherein the first external system is an enhanced equipment identity register (EEIR).

11. The method of claim 10, wherein the second external system is a provisioning gateway (PGW).

12. The method of claim 11, wherein the third external system is a secure entitlement server (SES).

13. The method of claim 9, wherein the query of the first external system is performed via an application programming interface (API).

14. A system for managing network services, the system comprising:

at least one internal application server connected to a core network;

a first external system server connected to the core network;

a second external system server connected to the core network; and a network services manager server connected to the core network, the network services manager server including one or more processors in communication with a memory containing processor-executable instructions to:

receive, from the at least one internal application server, a user selection of a mobile station integrated services digital network (MSISDN) identifier type via a subscriber identifier selection field and a query input of an MSISDN number associated with a subscriber;

based on the user selection of the MSISDN identifier type, query the first external system server using the MSISDN number;

in response to the query of the first external system server using the MSISDN number, receive, from the first external system server, a first set of subscriber information associated with the subscriber, the first set of subscriber information including a second subscriber identifier associated with the subscriber having a different identifier type than the MSISDN identifier type;

in response to receiving the second subscriber identifier, query the second external system server using the second subscriber identifier;

in response to the query of the second external system server using the second subscriber identifier, receive a second set of subscriber information; and populate one or more fields of a graphical user interface (GUI) with the first and second set of subscriber information.

15. The system of claim 14, wherein the second subscriber identifier is an international mobile subscriber identity (IMSI) number associated with the subscriber.

16. The system of claim 14, wherein the first external system server is a provisioning gateway (PGW).

17. The system of claim 16, wherein the second external system server is at least one of a switch control server or a secure entitlement server (SES).

18. The system of claim 14 further comprising a third external system server, and wherein the memory further comprises processor-executable instructions to:

query the third external system server using the MSISDN number; and in response to querying the third external system server with the MSISDN number, receiving a third set of subscriber information associated with the subscriber.

19. The system of claim 18, wherein the third external system server is at least one of an enhanced equipment identity register (EEIR) or an identity and access measurement (IAM) system.

20. The system of claim 14, wherein the query of the first external system server is performed via an application programming interface (API).

* * * * *